United States Patent [19]
Rowney et al.

[11] Patent Number: 5,987,140
[45] Date of Patent: Nov. 16, 1999

[54] SYSTEM, METHOD AND ARTICLE OF MANUFACTURE FOR SECURE NETWORK ELECTRONIC PAYMENT AND CREDIT COLLECTION

[75] Inventors: Kevin Thomas Bartholomew Rowney, San Francisco; Deepak S. Nadig, San Jose, both of Calif.

[73] Assignee: VeriFone, Inc., Santa Clara, Calif.

[21] Appl. No.: 08/639,909

[22] Filed: Apr. 26, 1996

[51] Int. Cl.⁶ .................................. H04L 9/00; H04L 9/30
[52] U.S. Cl. ................................. 380/49; 380/9; 380/23; 380/24; 380/25; 380/28; 380/30; 395/156; 395/187.01; 705/26; 705/35; 705/39
[58] Field of Search .................................. 380/9, 23, 24, 380/25, 48, 49, 50, 59, 28, 30; 705/26, 27, 35, 39, 40, 44; 395/186, 187.01

[56] References Cited

U.S. PATENT DOCUMENTS

| | | |
|---|---|---|
| 3,651,511 | 3/1972 | Andrews et al. . |
| 3,956,615 | 5/1976 | Anderson et al. . |
| 4,277,837 | 7/1981 | Stuckert . |
| 4,303,904 | 12/1981 | Chasek . |
| 4,454,414 | 6/1984 | Benton ..................................... 235/379 |
| 4,614,861 | 9/1986 | Pavlov et al. ........................... 235/380 |
| 4,630,201 | 12/1986 | White . |
| 4,689,478 | 8/1987 | Hale et al. ............................... 235/380 |
| 4,766,293 | 8/1988 | Boston .................................... 235/379 |
| 4,799,156 | 1/1989 | Shavit et al. . |
| 4,859,837 | 8/1989 | Halpern ................................... 235/380 |
| 4,877,950 | 10/1989 | Halpern ................................... 235/487 |
| 4,906,828 | 3/1990 | Halpern ................................... 235/379 |
| 4,935,962 | 6/1990 | Austin ....................................... 380/25 |
| 4,968,873 | 11/1990 | Dethloff et al. ......................... 235/380 |
| 4,992,646 | 2/1991 | Collin ..................................... 235/375 |
| 5,016,274 | 5/1991 | Micali et al. .............................. 380/23 |
| 5,030,806 | 7/1991 | Collin ..................................... 235/375 |
| 5,175,416 | 12/1992 | Mansvelt et al. ........................ 235/379 |
| 5,221,838 | 6/1993 | Gutman et al. .......................... 235/379 |
| 5,283,819 | 2/1994 | Glick et al. . |
| 5,297,030 | 3/1994 | Vassigh .................................... 705/25 |
| 5,420,405 | 5/1995 | Chasek ..................................... 235/379 |

(List continued on next page.)

FOREIGN PATENT DOCUMENTS

| | | |
|---|---|---|
| 0 172 670 A2 | 2/1986 | European Pat. Off. . |
| 0 256 768 A2 | 2/1988 | European Pat. Off. . |
| 0 256 768 A3 | 2/1988 | European Pat. Off. . |
| 0 326 699 | 8/1989 | European Pat. Off. . |
| 0 363 122 A2 | 4/1990 | European Pat. Off. . |
| 0 363 122 A3 | 4/1990 | European Pat. Off. . |
| 0 416 482 | 3/1991 | European Pat. Off. . |
| 0 527 639 | 2/1993 | European Pat. Off. . |
| 0 256 768 B1 | 3/1994 | European Pat. Off. . |
| 0 363 122 B1 | 12/1994 | European Pat. Off. . |
| 0 658 862 | 6/1995 | European Pat. Off. . |
| 0 666 681 | 8/1995 | European Pat. Off. . |
| 0 668 579 | 8/1995 | European Pat. Off. . |
| 2 251 098 | 6/1992 | United Kingdom . |
| WO 91/16691 | 10/1991 | WIPO . |
| WO 93/08545 | 4/1993 | WIPO . |

OTHER PUBLICATIONS

Marvin Sirbu et al.; "NetBill: An Internet Commerce System Optimized for Network Delivered Services"; IEEE CompCon Conference (Mar., 1995).

(List continued on next page.)

*Primary Examiner*—Bernaar E. Gregory
*Attorney, Agent, or Firm*—Sanford E. Warren, Jr.; Daniel J. Chalker; Gardere & Wynne, LLP

[57] ABSTRACT

Secure transmission of data is provided between a plurality of computer systems over a public communication system, such as the Internet. Secure transmission of data is provided from a customer computer system to a merchant computer system, and for the further secure transmission of data from the merchant computer system to a payment gateway computer system. The payment gateway system evaluates the information and returns authorization or denial of credit via a secure transmission to the merchant which is communicated to the customer by the merchant.

23 Claims, 12 Drawing Sheets

U.S. PATENT DOCUMENTS

| | | | |
|---|---|---|---|
| 5,440,634 | 8/1995 | Jones et al. | 380/24 |
| 5,442,791 | 8/1995 | Wrabetz et al. . | |
| 5,448,045 | 9/1995 | Clark | 235/382 |
| 5,452,352 | 9/1995 | Talton . | |
| 5,453,601 | 9/1995 | Rosen | 235/379 |
| 5,455,407 | 10/1995 | Rosen | 235/380 |
| 5,459,304 | 10/1995 | Eisenmann | 235/380 |
| 5,465,291 | 11/1995 | Barrus et al. . | |
| 5,475,826 | 12/1995 | Fischer . | |
| 5,476,259 | 12/1995 | Weingardt . | |
| 5,478,993 | 12/1995 | Derksen | 235/380 |
| 5,485,510 | 1/1996 | Colbert . | |
| 5,506,832 | 4/1996 | Arshi . | |
| 5,557,518 | 9/1996 | Rosen . | |
| 5,590,038 | 12/1996 | Pitroda . | |
| 5,590,197 | 12/1996 | Chen et al. | 380/24 |
| 5,638,445 | 6/1997 | Spelman et al. | 380/24 X |
| 5,671,279 | 9/1997 | Elgamal | 380/23 |
| 5,671,280 | 9/1997 | Aucsmith et al. | 380/30 |
| 5,677,955 | 10/1997 | Doggett et al. | 380/24 |
| 5,715,314 | 2/1998 | Payne et al. | 380/24 |
| 5,729,594 | 3/1998 | Klingman . | |
| 5,742,845 | 4/1998 | Wagner . | |
| 5,754,772 | 5/1998 | Leaf . | |
| 5,793,966 | 12/1998 | Amstein et al. . | |

OTHER PUBLICATIONS

Warr, Michael. "Business Wants Telecom of the Future—Today," Telephony's SUPERCOMM Wrap–up, pp. 12–13. Apr. 1991.

Müller, R., "Lon–Das Universelle Netzwerk, Teil 1." Elektronik., vol. 40, No. 22, Oct. 29, 1991, Munchen De, pp. 59–69, XP000268228.

Snow, C.R. et al: "Simple Authentication" Software Practice & Experience., vol. 24, No. 5, May 1994, Chichester GB, pp. 437–447, XP0006555455, p. 440–441.

Stallings, W. "Data and Computer Communications", 1994, MacMillan Publishing Co., New York, US, XP002069639, pp. 636–644, 663–666.

Anderson, R. et al. "NetCard—a Practical Electronic–cash System." International Workshop Proceedings, Security Protocols. International Workshop, Cambridge, UK, Apr. 10–12, 1996. p. 49. XP00203977.

Anderson, R.J., UEPS A Second Generation Electronic Wallet, (1992) University of Cambridge Computer Laboratory, pp. 411–418.

Bank Systems Technology, SET Tool Kit for Secure Commerce, (May 1996) p. 16.

Bellare et al., iKP—A Family of Secure Electronic Payment Tools, USENIX Association, First USENIX Workshop on Electronic Commerce, (Jul. 11–12, 1995) pp. 89–106.

Bryant, A., Am I Bid Six? Click to Bid Six!, The New York Times, (Mar. 13, 1996) pp. D1–D6.

Camp et al., Token and Notational Money in Electronic Commerce, USENIX Association, First USENIX Workshop on Electronic Commerce, (Jul. 11–12, 1995), pp. 1–12.

Cox et al., NetBill Security and Transaction Protocol, USENIX Association, First USENIX Workshop on Electronic Commerce, (Jul. 11–12, 1995), pp. 77–88.

One–Click Software Distribution Via the Web, Cutting Edge, Datamation, (May 1, 1996), p. 16.

Software Taps Net for Supply Data Sharing, Purchasing, EBN, (Apr. 22, 1996), p. 50.

Flohr, U., Electronic Money, Byte, (Jun. 1996), p. 74.

Gifford, et al., Payment Switch for Open Networks, USENIX Association, First USENIX Workshop on Electronic Commerce, (Jul. 11–12, 1995), pp. 69–75.

Gosling, et al., The Java Language Environment a White Paper, Sun Microsystems Computer Company, (May 1995).

Jones, et al., Securing the World Wide Web, Smart Tokens and Their Implementation, World Wide Web Journal, O'Reilly & Associates, Inc., (Dec. 11–14, 1995), pp. 397–409.

Kamens, J., Retrofitting Network Security to Third–Party Applications—The SecureBase Experience, USENIS Association, UNIX Security Symposium IV. (1993) pp. 41–57.

Marshall, M., Banking on the Internet, Communications Week, (May 20, 1996) No. 611.

Messmer, E., ActiveX Pioneer Pushes a Commerce, Network World, (May 6, 1996) p. 33.

Messmer, E., Edify Soft to Let Banks Open Doors Online, Network World, (May 20, 1996).

Messmer, E., Start–Up Puts Security SOCKS on Window Apps, Network World, (May 20, 1996).

Microsoft and VeriFone Announce Agreement to Deliver Commerce–enabled Internet Retailing Solutions, Microsoft Press Release, (Aug. 5, 1996) pp. 1–3.

Real Security, Mondex Magazine, (Summer 1996) pp. 5–6.

What's Up Doc?, That's Infotainment, Mondex Magazine, (Summer 1996) pp. 8–10.

Ready to Go. The Trillion Yen Business, Mondex Magazine, (Summer 1996) pp. 27–29.

Morgan, L., Cashing In: The Rush is on to Make Net Commerce Happen, Internet World, (Feb. 1995), pp. 48–51.

Nash, et al., Vendors Deliver Is–Specific Apps Over the 'Net, News (May 6, 1996) p. 16.

Nee, E., Hatim Tyabji, Upside, (Sep. 1996) pp. 85–93.

Neuman, et al., Requirements for Network Payment: The NetCheque Perspective, University of Southern California, (1995) pp. 32–36.

Ozer, K., Online Software Stores, PC Magazine, (May 28, 1996), p. 36.

Rodriguez, K., Pushing the Envelope, Communications Week, (May 13, 1996) pp. 37–39.

Rupley, S., Digital Bucks? Stop Here, PC Magazine, (May 28, 1996), pp. 54–60.

Semilof, M., Boosting Web Business, Communications Week, (May 20, 1996) pp. 31–32.

Sibert et al., The DigiBox: A Self–Protecting Container for Information Commerce, First USENIX Workshop on Electronic Commerce, (Jul. 11–12, 1995), pp. 171–183.

Sixbu, et al., NetBill: An Internet Commerce System Optimized for Network Delivered Services, Carnegie Mellon University, (1995) pp. 20–25.

Sviwa, C., Netscape Unveils New 'Net Commerce Offerings, Network World, (May 13, 1996) p. 10.

Singleton, A., Cash on the Wirehead, Byte, (Jun. 1995) pp. 71–78.

Tang, et al., A Set of Protocols for Micropayments in Distributed Systems, First USENIX Workshop on Electronic Commerce, (Jul. 11–12, 1995) pp. 107–115.

Thompson, et al., A Secure Public Network Access Mechanism, UNIX Security Symposium, (1992) pp. 227–238.

Trommer, D., ECS Catalog Merges EDI/Net Platforms: Enables Online Ordering in EDI Format Over Net, EBN, (May 20, 1996) p. 54.

Trommer, D., GE/Netscape Form Software Venture: Will Focus on Electronic Commerce Solutions, EBN, (Apr. 22, 1996) p. 54.

Vaughan–Nichols, Steven, XVision Turns a PC Into X Terminal for Unix, VMS Host, Government Computer News, Jul. 8, 1996, pp. 38, 42.
Vincenzetti et al., STEL: Secure TELnet, 5th UNIX Security Symposium, Jun. 5–7, 1995.
Wexler, Joanie, AT&T Sell Insurers on the Web, Network World, May 20, 1996, p. 27.
Wiggins, Richard, Business Browser: A Tool to Make Web Commerce Secure, Internet World, Feb. 1995, pp. 52, 54, 55.
Yacobi, Yacov, Efficient Electronic Money, Official Gazette, Apr. 23, 1996, p. 2976.
Yee et al., Secure Coprocessors in Electronic Commerce Applications, First USENIX Workshop on Electronic Commerce, Jul. 11–12, 1995, pp. 155–169.
ARA Banking Journal, Will SET Kill Card Fraud On the Internet?, Apr., 1996, pp. 237–238.
Advertising Age, Visa Turns To Redgate for Online, CD–ROM Work, Sample the Surf; Checkfree, Cybercash Interact; New on the 'Net; EDS Joins the Cyber–Rush, Jul. 17, 1995, pp. 249–250.
AFX News, Microsoft, American Express Unit Sign Internet Payment System Agreement, Feb. 29, 1996, p. 427.
Agence France Presse, Visa, Matercard Announce Security Standard for Internet, Feb. 1, 1996, p. 85.
The American Banker, Vendors Ready—and Waiting—for E–Commerce, Feb. 2, 1996, pp. 47–50.
The American Banker, News Analysis: Despite Accord, Hard Work Ahead On Security Standard for Internet, Feb. 2, 1996, pp. 51–53.
The American Banker, Microsoft Signs Visa as a Processor; Pact Gives Banks Alternative to Intuit, Feb. 14, 1996, pp. 528–529.
The American Banker, Two New On–Line Alliances Pair Niche Leaders, Feb. 21, 1996, pp. 493–494.
The American Banker, News Analysis: Beware of Deals Like Verifone–Oracle, Banks Told, Feb. 27, 1996, pp. 443–445.
The American Banker, Amex Accepts SET Protocol For Payments On Internet, Mar. 1, 1996, pp. 382–383.
The American Banker, Encryption Software Firm Adopts On–Line Protocol, Mar. 14, 1996, p. 352.
The American Banker, Frontiers, Mar. 18, 1996, pp. 317–319.
The American Banker, Card Briefs: Novus Supporting SET Payment Protocol, Apr. 2, 1996, p. 235.
The American Banker, If It Has To Do With Data Security, Changes Are This 'Little' Company Is in Involved, Apr. 15, 1996, pp. 156–160.
The American Banker, On the Question of Internet Security, A Three–Sided Debate, Apr. 15, 1996, pp. 161–165.
The American Banker, Web Security Firm To Add MC–Visa Protocol, Apr. 23, 1996, pp. 130–131.
The American Banker, Card Briefs: ICverify Internet Tools To Get SET Protocol, May 3, 1996, p. 53.
The American Banker, Mastercard Official Resigns To Lead Internet Security Firm, May 3, 1996, pp. 54–55.
American Marketplace, Visa–Mastercard Security Agreement: A Green Light For Online Commerce, Feb. 8, 1996, pp. 5–6.
Amusement Business, More 'Digital Homeless' Find Place in Cyberspace; Professionals Not Subscribing To An Online Computer Service, Feb. 12, 1996, pp. 536–537.
AP Online, Cable TV's Sci–Fi Channel, Jun. 9, 1995, pp. 259–261.
AP Online, Purchases On Net Studied, Jan. 31, 1996, pp. 171–172.
AP Online, AP Top News At 5 a.m. EST Thursday, Feb. 1, 1996, Feb. 1, 1996, pp. 86–88.
AP Online, AP Top News At 6 a.m. EST Thursday, Feb. 1, 1996, Feb. 1, 1996, pp. 89–91.
AP Online, AP Top News At 7 a.m. EST Thursday, Feb. 1, 1996, Feb. 1, 1996, pp. 92–94.
AP Online, AP Top News At 8 a.m. EST Thursday, Feb. 1, 1996, Feb. 1, 1996, pp. 95–97.
AP Online, AP Top News At 9 a.m. EST Thursday, Feb. 1, 1996, Feb. 1, 1996, pp. 115–117.
AP Online, AP Financial News At 9:10 a.m. EST Thursday, Feb. 1, 1996, Feb. 1, 1996, pp. 118–122.
AP Online, AP Top News At 10 a.m. EST Thursday, Feb. 1, 1996, Feb. 1, 1996, pp. 125–127.
AP Online, Standard Found For Web Credit, Feb. 1, 1996, pp. 123–124.
AP Online, AP financial News at 11:10 a.m. EST Thursday, Feb. 1, 1996, Feb. 1, 1996, pp. 107–110.
AP Online, AP Financial News At 3:10 p.m. EST Thursday, Feb. 1, 1996, Feb. 1, 1996, pp. 98–102.
AP Online, AP Financial News At 5:10 p.m. EST Thursday, Feb. 1, 1996, Feb. 1, 1996, pp. 103–106.
AP Online, AP Financial News At 5:20 p.m. EST Thursday, Feb. 1, 1996, Feb. 1, 1996, pp. 111–114.
AP Online, Amer Express Backs Rival Idea, Feb. 29, 1996, pp. 428–429.
AP Worldstream, Financial Pages, Feb. 1, 1996, pp. 128–129.
AP Worldstream, Financial Pages, Feb. 29, 1996, pp. 430–432.
AP Worldstream, A Summary of News From the U.S. Virgin Islands, May 25, 1995, pp. 265–268.
Asia, Inc., Internet Security, May 1996, pp. 64–66.
Asia, Inc., Internet Security, May 1996, pp. 67–69.
Asian Banker, Shopping On the Internet, Mar. 1996, pp. 384–388.
Asian Wall Street Journal, Fraud, Nosy Web Pages Torment Internet Users, Mar. 18, 1996, p. 320.
Asiaweek, Protocols, Cyber Security; How to Head Off the Hackers, Feb. 23, 1996, pp. 489–490.
Associated Press, Cable's Sci–Fi Channel Creates World Wide Web 'Home Page', Jun. 9, 1995, pp. 262–264.
Associated Press, Visa and MasterCard Lead Group to Make Credit Purchases Safe On the Net, Jan. 31, 1996, pp. 173–174.
Associated Press, Visa, MasterCard Resolve Technical Differences For On–Line Credit Transactions, Feb. 1, 1996, pp. 130–131.
Associated Press, American Express Endorses Rivals' Ideal for Secure Online Credit, Feb. 29, 1996, pp. 433–434.
Associated Press, American–Express Endorses Rivals' Idea For Secure Online Credit, Mar. 1, 1996, pp. 389–390.
Austin American–Statesman, Standard Proposed For Electronic Verification, Jul. 3, 1995, pp. 251–252.
Austin American–Statesman, Credit Cards To GFet Internet Security; Visa, MasterCard Have Agreed On a Way to Scramble Card Numbers, Feb. 2, 1996, pp. 45–46.
Baltimore Sun, Sun Names former Reporter to lead Move Into Internet; Service Will offer News and Advertising, Jan. 31, 1996, pp. 175–176.
Banker, Banks Take Charge, Mar. 1996, pp. 396–399.
Banker, Product, Mar. 1996, pp. 400–403.

Banker, Technology, Banks Take Charge, Mar. 1996, pp. 391–394.

Banker, Visa and MasterCard Join Forces to Develop Standards, Mar. 1996, p. 395.

Banker, Credit Card Standards, Apr. 1996, p. 239.

Banking Policy Report, Visa and MasterCard Move to Safeguard Card Transactions on Internet, Mar. 4–18, 1996, pp. 370–371.

Bank Systems & Technology, First Union, Open Market Hit the Internet, May 1995, pp. 269–270.

Black Sun Interactive, 3D PointWorld, Downloading, PointWorld, Apr. 16, 1996, p. 1.

Business Journal–Portland, Taking the Plunge Into On–Line Sales, Feb. 9, 1996, pp. 2–4.

Business Times, SNS Online Service Confident of Success, Nov. 27, 1995, pp. 184–186.

Business Times, Opening Windows to Net Security, Mar. 6, 1996, pp. 362–363.

Business Times, Card, IT Leaders Make Shopping On the Net Safer, Apr. 2, 1996, p. 236.

Business Wire, MasterCard International Goes Live On the Internet; New MasterCard World Wide Web Site Home Page Combines Utility and Imagination, Mar. 27, 1995, pp. 294–296.

Business Wire, Adobe and Netscape to Bring Commercial Publishing to the Internet, Mar. 28, 1995, pp. 291–293.

Business Wire, Emerging U.S. Debit Market Attracts International Player Jul. 27, 1995, pp. 244–245.

Business Wire, VeriSign Inc. to Provide Digital IDs for Open Market's Secure WebServer; Key Technology for Verifying the Identities of Parties in Electronic Commerce, Aug. 14, 1995, pp. 241–243.

Business Wire, ComNet '96 Explores Electronic Commerce; Business On the Internet the Focus of Many Conference Sessions, Jan. 4, 1996, pp. 181–183.

Business Wire, "Computer Within a Floppy Disk" Puts Secure Electronic Commerce In the Palm of Your Hand, Jan. 17, 1996, pp. 179–180.

Business Wire, RSA Data Security, Inc. Establishes Japanese Subsidiary Company to Market RSA Encryption Technology to Developers in Japan, Feb. 8, 1996, pp. 7–8.

Business Wire, VeriSign to Provide Digital ID Services for FTP Software's Esplanade (TM) Web Server for Windows NT; Alliance Will Ensure Secure Electronic Transactions for Users of New Web Servers, Feb. 12, 1996, pp. 538–540.

Business Wire, First Data and Netscape Offering Internet Payment Processing Service; New Service Available Now, Feb. 20, 1996, pp. 500–501.

Business Wire, RSA Announces Support for SET Payment Standard Across Entire Product Line; World's Most Popular Encryption Solution Provider Now Supports Visa/MasterCard Standard for Secure Payments Over the Internet, Mar. 4, 1996, pp. 372–373.

Business Wire, Certicom—Special Task Group to Review Secure Electronic Transaction Protocol Developed by Visa and MasterCard—Sherry E. Shannon Appointed Chair of the New Task Group, Mar. 15, 1996, pp. 340–341.

Business Wire, Panel of Electronic Commerce Experts to Reveal "What Gates and McNealy Won't Tell You About Electronic Commerce"—ICat Corp. Convenes Panel of Pioneers to Discuss the Hype and Reality at New York Trade Show, Mar. 26, 1996, pp. 289–290.

Business Wire, Major Flaws Seen in Visa/MasterCard Security Plan for Internet Commerce; Network Security Expert Says RSA Encryption and Authentication Standard Leaves Consumers Vulnerable to Hackers, Apr. 16, 1996. pp. 154–155.

Business Wire, ICVERIFY to Incorporate SET Specification in its Software Solutions; SET Specification Provides Long Awaited Internet Security for Both Customers and Merchants, Apr. 26, 1996, pp. 125–126.

Business Wire, John Gould Joins Terisa Systems As Chief Executive Officer, Apr. 29, 1996, pp. 102–103.

Business Wire, IBM Leads Industry With Comprehensive Strategy, Technologies for Electronic Commerce; Electronic Shopping, Secure Transactions, May 1, 1996, pp. 70–75.

Business Wire, L.L. Bean Signs Up With IBM; IBM Announces New Products, Services that Make Internet Real for Business, May 1, 1996, pp. 76–80.

Business Wire, Electronic Commerce Just Got Real; NETCOM, Federal Express, Open Market and CheckFree Join iCat to Discuss Breakthrough Electronic Commerce Solution, May 2, 1996, pp. 59–61.

Calgary Herald, Visa and MasterCard Agree On Standard, Feb. 2, 1996, pp. 54–55.

Calgary Herald, 'Net Security Hinders Commerce, Apr. 4, 1996, pp. 228–229.

Canada Newswire, Attention Business/Technology Editors: Special Task Group to Review Secure Electronic Transaction Protocol Developed by Visa and MasterCard, Mar. 15, 1996, pp. 342–343.

CardFAX, A Joint Technical Standard for Security Credit Card Transactions Over the Internet, Feb. 2, 1996, p. 56.

Card News, Security Advances May Improve, Not Perfect, On–Line Transactions, Feb. 5, 1996, pp. 28–30.

Card News, Amex, First Data Initiate On–Line Purchase Efforts, Mar. 4, 1996, pp. 374–375.

Card News, Card News Briefs: Discovery Joins Security Rush, Apr. 1, 1996, p. 240.

Card News, Cards on the Web Addressed, Apr. 29, 1996, pp. 104–105.

Cards International, VeriSign Secures Net Deals, Jul. 20, 1995, pp. 246–247.

Cards International, International: MC and Visa Co–Operate On Internet Specs, Feb. 14, 1996, 530–531.

Cards International, Amex Set to Support Security Specs, Mar. 12, 1996, pp. 356–357.

Charleston Gazette, Secure Internet Credit Code Unveiled, Feb. 2, 1996, pp. 57–59.

U.P.I., Checkfree Partnering With Cybercash, Jul. 19, 1995, p. 248.

Chicago Sun–Times, Visa, MasterCard Agree On Online Security, Feb. 2, 1996, pp., 60–61.

Christian Science Monitor, Visa, MasterCard Tackle Internet Security, Feb. 2, 1996, p. 80.

Columbus Dispatch, Roving Bandits Make Buying Risky Business, Nov. 6, 1994, p. 312–313.

COMLINE Daily News from Korea, MasterCard, Visa Agree to a Single Security Standard, Feb. 7, 1996, p. 11.

Communications News, Business Banks Its Future On Electronic Commerce, Strategies Being Pursued for Secure Financial Transactions on the Internet; Netcomm Update; Industry Trend or EventCom, Apr. 1996, pp. 241–243.

CommunicationsWeek, MCI Offers Secure Transaction Service, Oct. 2, 1995, pp. 229–230.

CommunicationsWeek, In Brief; Charge It On the 'Net, Feb. 5, 1996, p. 31.

CommunicationsWeek, On–Line Payment Scheme Arrives, Feb. 26, 1996, pp. 456–458.
CommunicationsWeek, In Brief, Amex 'Set' For Internet, Mar. 4, 1996, p. 376.
CommunicationsWeek, Safety On the 'Net—Can Encryption Offer Peace of Mind to Nervous Network Managers, Mar. 25, 1996, pp. 299–303.
CommunicationsWeek, Tandem, VLSI Partner to Develop Security Chips for Commerical Use, Apr. 15, 1996, pp. 166–167.
CommunicationsWeek, Shop Till You Drop With the JEPI Standard, Apr. 22, 1996, pp. 134–135.
CommunicationsWeek, Terisa, to Add Set to Web Software, Apr. 29, 1996, pp. 106–107.
CommunicationsWeek, Netscape Adds Electronic–Commerce Apps, May 13, 1996, pp. 10–11.
CommunicationsWeek, Internet Security—A Moving Target, May 13, 1996, pp. 12–15.
Computer Conference Analysis Newsletter, UniForum; Conference On Unix and Open Systems With Focus On the Internet; Industry Trend or Event, Feb. 26, 1996, pp. 459–479.
Computer Connection, Telecomm Decanoy Act Draws Cheers, Jeers and Fears, Feb. 10, 1996, pp. 549–557.
Computer Connection, Internet Security Standards Agreement, Feb. 10, 1996, pp. 558–559.
Computergram International, Microsoft Confounded: Visa–MasterCard Spec Free, Feb. 2, 1996, p. 62.
Computergram International, First Data, Netscape Jointly Deliver First Real–Time On–Line Credit, Apr. 11, 1996, p. 223.
Computer Reseller News, Terisa Systems Enters Channel With Security Products, Apr. 22, 1996, pp. 136–137.
Computer Shopper, AT&T Offers Low–Tech Protection for Internet: No–Deductible Insurance for Online Buyers, May, 1996, pp. 81–82.
Computer Technology Review, Digital Signatures Keep Cyberstreets Safe for Shoppers, Feb. 1996, pp. 132–134.
Computer Weekly, Web Takes the Credit; Visa, MasterCard Join Forces to Develop Secure Payment Systems for Electronic Commerce; Company Business and Marketing, Feb. 8, 1996, pp. 9–10.
Computerworld, News Shorts, Feb. 5, 1996, pp. 32–33.
Computerworld, Microsoft Provides Rapid Net Deployment Ability, Mar. 18, 1996, pp. 321–323.
Computerworld, Briefs, Mar. 18, 1996, p. 324.
Computerworld, Predictions, Apr. 29, 1996, pp. 108–110.
Computerworld, Credit–Card Authorization Set For Net, May 13, 1996, pp. 16–17.
Corporate EFT Report, MasterCard, Visa to Combine Internet Security Standards, Feb. 7, 1996, pp. 12–13.
Corporate EFT Report, Products Could Spur On–Line Transactions, Mar. 6, 1996, pp. 364–365.
Corporate EFT Report, Amex Eyes Internet Security, Mar. 6, 1996, p. 366.
Corporate EFT Report, Corporate EFT Report News Briefs, Apr. 3, 1996, pp. 230–231.
Credit Card Management, Internet Commerce Gets A Boost, Mar. 1996, pp. 404–405.
Credit Card News, Electronic Commerce Gets a Boost, Feb. 15, 1996, pp. 526–527.
Daily Mail, Now Spending Cuts Are On the Cards; Money Mail, Feb. 7, 1996, pp. 14–15.
Daily Telegraph, Card Guard Makes It Safer to Cybershop, Feb. 2, 1996, p. 63.
Daily Telegraph, Innovations: Codes to Beat the Criminal Internet, Feb. 13, 1996, pp. 534–535.
Datamation, Microsoft Plays Internet Catch–U. Microsoft & the Enterprise: I–Nets; Company Business and Marketing; Cover Story, Mar. 15, 1996, pp. 344–348.
Des Moines Register, Safe Shopping On–Line; Card Associations Agree On Internet Security, Feb. 17, 1996, pp. 520–522.
Digital Media, Turning the Page; MCI Switches From News Corp to the Microsoft Network; Letter; Company Business and Marketing Column, Mar. 12, 1996, pp. 358–360.
Discount Merchandiser, Secure Electronic Transactions, Mar. 1996, pp. 406–407.
DM News, Open Market Offers Internet Security; Clients Can Get On the World Wide Web For Less Than $1,000, Apr. 3, 1995, pp. 281–282.
DM News, Mainstream Alternative For Advertisers; Business Wants to be Visible; Cybercitizens Want to Buy, Feb. 12, 1996, pp. 543–545.
DM News, Canadian Big Guns Set Sights On Skittish Cybershoppers; St. Remy Multimedia, Cogco Cable in Quadruple Play, Feb. 19, 1996, pp. 506–508.
DM News, IRM's Commercial Online Service Will Build DBs, Track Spending, Feb. 19, 1996, pp. 509–510.
Denver Post, On–Line Car Dealer Rings Up 57 Sales In Four Months, Feb. 10, 1995, pp. 299–300.
dot.COM, Internet Data's Payment Service, Mar. 1, 1996, p. 408.
Edge: Work–Group Computing Report, Digital ID: Verisign Inc. To Provide Digital IDS For Open Market's Secure Webserver; Key Technology For Verifying the Identifier of Parties In Electronic Commerce, Aug. 21, 1995, pp. 236–237.
Edge: Work–Group Computing Report, E–Commerce: IBM Leads Industry With Comprehensive Strategy, Technologies for Electronic Commerce; Electronic Shopping, Secure Transactions, May 6, 1996, pp. 48–52.
EDI News, MasterCard, Visa To Combine Internet Security Standards, Feb. 19, 1996, pp. 511–512.
EDP Weekly, Visa, MasterCard Announce Single Technical Standard To Safeguard Payment Card Purchases on Internet, Feb. 12, 1996, p. 546.
EDP Weekly, American Express To License Microsoft, Software To Help Secure Transactions Via Internet, Mar. 11, 1996, p. 361.
EDP Weekly, ANSI Committee Creates Special Task Group To Review Secure Electronic Transaction Protocol, Mar. 25, 1996, p. 304.
EDP Weekly, Network Security Expert Notes Major Flaws in Visa/MasterCard Security Plan, Apr. 22, 1996, p. 140.
EFT Report, Service Variety Seen Key to Home Banking's Future, Mar. 29, 1995, pp. 288–290.
EFT Report, MasterCard, Visa To Combine Internet Security Standards, Feb. 14, 1996, pp. 532–533.
Electronic Buyers' News, EC Providers Take On Security—Visa, MC Announce Transaction Standard; GE Intros B–to–B Solution, Feb. 12, 1996, pp. 547–548.
Electronic Buyers' News, SET Controversy Flares Up—Insiders Debate Integrity Of Proposed Standard, Apr. 29, 1996, pp. 113–115.
Electronic Engineering Times, Credit–Card Firms Agree On Security, Feb. 5, 1996, p. 34.
Electronic Engineering Times, E–Cash Coming? Bank On It, Feb. 19, 1996, pp. 513–516.

Electronic Engineering Times, Secure Internet Transactions Seen, Feb. 26, 1996, pp. 480–481.

Electronic Engineering Times, Copyright Protection Moves Into Digital Age, Mar. 18, 1996, pp. 325–327.

Electronic Engineering Times, Form Factors Figures Into Security Debate, Apr. 29, 1996, pp. 111–112.

Electronic Marketplace Report, Visa, MasterCard Announce Standard For Securing Internet Transactions, Feb. 6, 1996, pp. 17–18.

Electronic Messaging News, Visa, MasterCard Combine Standards, Feb. 7, 1996, p. 16.

Electronic Messaging News, MasterCard, Visa In Internet Pact, Feb. 26, 1996, p. 482.

Electronic Payments International, Ingenico Buys Innovatron Data Systems, Mar. 1996, pp. 409–410.

Electronic Payments International, Getting All Set For On–Line Commerce, Mar. 1996, pp. 411–412.

Electronic Payments International, The Growing Impact of the Internet, Mar. 1996, pp. 413–415.

Electronic Payments International, Telefonica Makes the Right Calls Before SET, Apr. 1996, pp. 244–245.

Electronic Payments International, Consortium Explores Internet Payments, Apr. 1996, pp. 246–247.

Electronic Payments International, Telefonica Makes the Right Calls Before SET, Apr. 1996, pp. 248–249.

Electronic Payments International, Consortium Explores Internet Payments, Apr. 1996, pp. 250–251.

Exchange, Novell Expands Networked Application and Electronic Commerce Offerings, Mar. 22, 1996, pp. 315–316.

Extel Examiner, Microsoft, American Express Unit Sign Internet Payment System, Feb. 29, 1996, p. 435.

FDCH Political Transcripts, The National Consumers League Holds a News Conference on Combatting Fraud on the Internet; Washington, D.C., Feb. 27, 1996, pp. 446–455.

Federal Document Clearing House Congressional Testimony, Testimony Oct. 17, 1995 Eugene Ludwig Comptroller Office of the Comptroller of the Currency House Banking Financial Institutions and Consumer Credit Bank Consolidation and Interstate Mega–Mergers, Oct. 17, 1995, pp. 214–226.

Federal News Service, Prepared Testimony of Eugene A. Ludwig Controller of the Currency Before the House Committee on Banking and Financial Services Subcommittee on Financial Institutions, Oct. 17, 1995, pp. 195–205.

Federal News Service, Prepared Statement of Joel S. Lisker Senior Vice President, Security and Risk Management Mastercard International Incorporated Before the House Committee on Banking and Financial Services, Apr. 15, 1996, pp. 168–172.

Federal News Service, Hearing of the House Banking and Financial Services Committee, Apr. 15, 1996, pp. 173–216.

Financial Post, Reaching Out on the Electronic Highway, Mar. 14, 1996, pp. 353–355.

Financial Post, Race on to Come Up With Web Payment System, Apr. 27, 1996, pp. 122–124.

Financial Times, Credit Card Groups to Co–Operate on Internet Security, Feb. 2, 1996, p. 64.

Fresno Bee, Credit Firms Set Internet Security Code, Feb. 2, 1996, p. 65.

Gazette (Montreal), Digital Sermon Packs 'Em In: 1,100 From Business World listen Raptly to Technoguru's Generalities, Apr. 18, 1996, pp. 149–151.

Gazette (Montreal), Bell Global Has High Hopes for Business Network, Apr. 19, 1996, pp. 147–148.

Houston Chronicle, Firms Back Cyberspace Verification System, Jun. 26, 1995, pp. 253–256, 255–256.

Independent, In Brief: Amex and Microsoft Sign Internet Deal, Mar. 1, 1996, p. 416.

Industry Week, Move Over China, Caught In the Web, May 1, 1995, p. 271.

Information & Interactive Services Report, Microsoft, Wal–Mart Pact Aims for Online Bargain–Hunters, Feb. 23, 1996, pp. 491–492.

InformationWeek, Intranet Tools, E–Mail on the Net to Debut—Major Announcements Expected at Internet World, Electronic Messaging Association Conferences, Apr. 22, 1996, pp. 142–143.

InformationWeek, Cisco Places $4 Billion Network Bet—StrataCom Buy Seen Extending ATM, Tying Switching and Routing, Apr. 29, 1996, pp. 116–117.

InformationWeek, Netscape's Corporate Push Grows—CompuServe Tie–In Puts Groupware on Internet, May 13, 1996, p. 27.

InformationWeek, In Short; Terisa Names CEO, May 13, 1996, p. 29.

InfoWorld, National Semiconductor's PersonaCard; Card Holds Key to On–Line Security, Nov. 14, 1994, pp. 310–311.

InfoWorld, Standards; Adapt or Die: Internet Standards May Always Be In Flux, Nov. 6, 1995, pp. 187–192.

InfoWorld, At Deadline, Feb. 5, 1996, pp. 35–36.

InfoWorld, RSA Sale May Improve Security, Apr. 22, 1996, p. 144.

InfoWorld, Pipeline, Apr. 22, 1996, p. 145.

InfoWorld, Internet Servers; Netscape Antes Up for Commerce, May 13, 1996, pp. 30–31.

InfoWorld, IBM, HP Preview 'Net products Aimed On–Line Commerce, May 13, 1996, p. 33.

InfoWorld, Web Page Authoring Tool; Internet Creator Builds Sites One Paragraph at a Time; No Need to Master HTML; Tool Enables On–Line Commerce, May 13, 1996, pp. 35–37.

InformationWeek, Europe, Oct. 2, 1995, pp. 231–234.

Interactive Daily, 4. Cyberspace Security Bolstered by Pact, Feb. 2, 1996, p. 68.

Interactive Daily, 5. Microsoft Allies With American Express, Mar. 1, 1996, p. 417.

Interactive Marketing News, Mastercard and Visa Reach Agreement on Security Protocols, Feb. 16, 1996, pp. 523–524.

International Herald Tribune, A Giant Leap for Credit Cards? System to Protect Payments on Internet is Unveiled, Feb. 2, 1996, pp. 66–67.

Investor's Business Daily, The Electronic Wallet: Secure Payment Methods Sought for Internet, Dec. 8, 1994, pp. 305–307.

Investor's Business Daily, CEO Briefing; A4, Mar. 28, 1996, pp. 285–286.

Korea Economic Daily, Mastercard, Visa Agree to a Single Security Standard, Feb. 6, 1996, p. 19.

Los Angeles Times, The Cutting Edge: Special Report/Hot Tips; What's Coming, When, and Whey It's a Big Deal; Next Year Could Bring Start Of On–Line Profits, Dec. 18, 1994, pp. 303–304.

Los Angeles Times, Technology, Feb. 1, 1996, p. 139.

M2 Presswire, Adobe and Netscape to bring Commercial Publishing to the Internet (C) 1994–95 M2 Communications LTD, Mar. 31, 1995, pp. 283–285.

M2 Presswire, Verisign, Inc: VeriSign Inc to Provide Digital IDs for Open Market's Secure WebServer, Aug. 16, 1995, pp. 238–240.
M2 Presswire, Rednet: EDI for the Apple Macintosh and Power PC, Oct. 24, 1995, pp. 193–194.
M2 Presswire, Visa Intl: Security Specifications for Card Transactions on Internet Combined into One Standard, Feb. 1 1996, pp. 140–141.
M2 Presswire, First Data: FD and Netscape Offering Internet Payment Processing Service New Service Available Now, Feb. 21, 1996, pp. 495–496.
M2 Presswire, Visa: Visa and MasterCard Welcome American Express to Their Internet Payment System, Mar. 1, 1996, pp. 418–419.
M2 Presswire, Credit Card Research Group: Cards to Make a Clean Sweep of the Cybermarket, Mar. 1, 1996, pp. 420–421.
M2 Presswire, Racal Airtech: Racal Supports the Visa/MasterCard Secure Electronics Transactions, (SET) Specification, May 2, 1996, pp. 62–63.
Media Daily, Microsoft, Visa Announce Specification to Secure Payments, Sep. 27, 1995, p. 235.
Media Daily, Mastercard and Visa Agree on Online Security Standard, Feb. 1, 1996, p. 136.
Media Daily, Netscape Launches Payment System, May 13, 1996, p. 38.
Report on Microsoft, News Briefs: Visa and Mastercard, Apr. 22, 1996, p. 146.
Midrange Systems, GEIS Aims to Stimulate EDI Growth, Mar. 15, 1996, pp. 349–350.
Milwaukee Journal Sentinel, U.S. Postal Service to Enter Electronic Age, Mar. 4, 1996, pp. 379–380.
Multimedia & Videodisc Monitor, Tools & Technology: Mastercard, Visa Agree on Encryption Technology, Mar. 1, 1996, p. 422.
Multimedia Week, Industry Briefs: Encryption, Feb. 5, 1996, p. 39.
Nation's Restaurant News, Amex, Microsoft Seal Security Agreement. American Express Travel Related Services Co. Signs Licensing Agreement With Microsoft Corp.; Brief Article, Mar. 18, 1996, p. 328.
Nave Research Group, Navigating and Acting in Virtual Environments, May 16, 1996, pp. 1–9.
Network Briefing, Visa & Mastercard Agree E–Payment Spec, Feb. 16, 1996, p. 525.
Network Computing, More Than One Way to Skin a Coded Cat, Mar. 15, 1996, p. 351.
Network World, Wells Fargo Hops Aboard 'Net Wagon, Feb. 6, 1995, pp. 301–302.
Network World, An Insecure Feeling Haunts the 'Net, Feb. 12, 1996, pp. 541–542.
Network World, Wal–Mart to Lure Electronic Shoppers With Web Retail Store, Feb. 19, 1996, pp. 504–505.
Network World, News Briefs, Mar. 4, 1996, pp. 377–378.
Network World, Security Specification Is Full of Holes, Critics Charge, Apr. 22, 1996, pp. 138–139.
Network World, ActiveX Pioneer Pushes Commerce, May 6, 1996, pp. 46–47.
Network World, Ready, SET, Go; American Express, MasterCard, and Visa Throw Their Combined Weight Behind the SET Payment Protocol for the Web; Merchants May Face a Learning Curve, May 13, 1996, pp. 18–23.
Network World, Effort Aims to Unite 'Net Payment Schemes, May 13, 1996, p. 24.
Network World, Netscape Unveils New 'Net Commerce Offerings, May 13, 1996, pp. 25–26.
News, Credit Card Fraud New Concern of Internet Business, Mar. 16, 1996, pp. 329–330.
Newsbytes News Network, France—Bull Forms Smart Card Subsidiary Apr. 13, 1995, Apr. 13, 1995, pp. 274–275.
Newsbytes News Network, Open Market Intros "Secure" Web Storefront Oct. 17, 1995, Oct. 17, 1995, pp. 206–207.
Newsbytes News Network, Newsbytes Daily Summary Oct. 17, 1995, Oct. 17, 1995, pp. 208–213.
Newsbytes News Network, Commerce Direct Offers Secure Electronic Transactions Jan. 22, 1996, Jan. 22, 1996, pp. 177–178.
Newsbytes News Network, ****Visa, Mastercard Combine Internet Security Standards Feb. 2, 1996, Feb. 2, 1996, pp. 71–72.
Newsbytes News Network, GTE's CyberTrust For Web Electronic Commerce Feb. 6, 1996, Feb. 6, 1996, pp. 20–21.
Newsbytes News Network, AT&T WorldNet Spurs Online Credit Use Feb. 6, 1996, Feb. 6, 1996, pp. 22–23.
Newsbytes News Network, Open Market, Interleaf Team On Web "Secure Doc Mgt" Mar. 5, 1996, Mar. 5, 1996, pp. 367–369.
Newsbytes, Web Marketplace—Online Security Agreement Almost Here Apr. 10, 1996, Apr. 10, 1996, pp. 224–225.
News Tribune, Business Briefly, Feb. 2, 1996, pp. 69–70.
New York Times, A New Standard is Proposed for Electronic Verification, Jun. 26, 1995, pp. 257–258.
New York Times, Plan to Guard Credit Safety on Internet, Feb. 1, 1996, pp. 142–143.
New York Times, Jan. 28–Feb. 3; Attention, Cyber–Shoppers!, Feb. 4, 1996, p. 40.
New York Times, Diary, Feb. 4, 1996, pp. 41–43.
Nightly Business Report, Feb. 1, 1996, pp. 144–154.
Nightly Business Report, Feb. 1, 1996, pp. 150–154.
Orange County Register, Life on the Line; Credit Where Credit is Due, Mar. 31, 1996, pp. 283–284.
Orange County Register, Bits and Pieces, Apr. 7, 1996, pp. 226–227.
PC Magazine, MasterCard and Visa Join Forces for Net Commerce; To Develop the Secure Electronic Transactions Technical Standard for Protecting Credit Card Purchases Made Over the Internet; Technology Information; Brief Article, Mar. 26, 1996, pp. 291–292.
PC Magazine, Skinny Client to Rule on Web; Corporate Intranets Will Fuel a New Breed of Applications; Industry Trend or Event; Brief Article, Mar. 26, 1996, pp. 293–294.
PC Magazine, MasterCard and Visa Join Forces for Net Commerce, Mar. 26, 1996, pp. 295–296.
PC Magazine, Skinny Clients to Rule on Web, Mar. 26, 1996, pp. 297–298.
PC Magazine, Digital Bucks? Stop Here; Electronic Commerce Services; The Web at War: The Battle for the Future of the Internet; Company Business and Marketing, May 28, 1996, pp. 2–5.
PC Magazine, Digital Bucks? Stop Here, May 28, 1996, pp. 6–9.
PC User, Shortlist; News Briefs, Feb. 21, 1996, pp. 497–499.
PC Week, Briefly Noted; News Briefs; Brief Article, Feb. 5, 1996, pp. 37–38.
PC Week, AT&T Ramps Up Internet Commerce, Access to WorldNet Service; Company Business and Marketing; Brief Article, Feb. 19, 1996, p. 517.

PC Week, Big Player; Deals to Speed Net Commerce; Netscape, Oracle, HP Cut Agreements for Credit–Card Systems, Security; Industry Trend or Event, Feb. 26, 1996, pp. 483–484.

PC Week, Microsoft Reposition MSN; Microsoft Network to Offer New Services; Online Service Information; Brief Article, Feb. 26, 1996, pp. 485–486.

PC Week, Microsoft Reposition MSN, Feb. 26, 1996, pp. 487–488.

PC Week, Briefly Noted; News Briefs; Brief Article, Mar. 4, 1996, p. 381.

PC Week, New Security Protocol Spurs Internet Took Kits, Secure Electronic Transaction, Industry Trend or Event, Apr. 15, 1996, pp. 217–218.

PC Week, New Security Protocol Spurs Internet Took Kits, Apr. 15, 1996, pp. 219–220.

PC Week, IBM Takes Charge of E–Commerce: Plans Client, Server Apps Based on SET; NetCommerce Electronic Commerce System; Product Announcement, Apr. 29, 1996, pp. 118–119.

PC Week, IBM Takes Charge of E–Commerce; Plans Client, Server Apps Based on SET, Apr. 29, 1996, pp. 120–123.

Portland Press Herald, L.L. Bean to Offer Ordering By Internet; It's a Bold Move for a Firm That's Usually Slow to Adopt New Technology, May 2, 1996, pp. 56–58.

PR Newswire, Bank One Joins Commercenet, Oct. 17, 1994, pp. 314–315.

PR Newswire, Rudolph Beware MCI to Offer Cyber–Santas a Faster Route to the Mall Via Mouse; MarketplaceMCI Opens Door to 25 Million New Customers; Integrated Software Package Assures Secure Electronic Transactions, Nov. 22, 1996, pp. 308–309.

PR Newswire, Microsoft Corp. Chooses Software.Net (TM) to be First to Electronically Deliver Microsoft Software; Software.Net to Electronically Market Over Microsoft Products Via the Internet, Oct. 17, 1995, pp. 227–228.

PR Newswire, Visa and MasterCard Combine Security Specifications for Card Transactions on the Internet into One Standard; Move Expected to Accelerate Development of Electronic Commerce and Bolster Consumer Confidence in the Security of Cyberspace Transactions, Feb. 1, 1996, pp. 155–156.

PR Newswire, SAIC is EXourservice for Secure Electronic Transactions on the Internet, Feb. 29, 1996, pp. 436–437.

PR Newswire, American Express Signs Licensing Agreement With Microsoft to Make Secure Purchases Over the Internet, Feb. 29, 1996, pp. 438–439.

PR Newswire, Visa and Mastercard Welcome American Express, Feb. 29, 1996, pp. 440–441.

PR Newswire, Centura Announces the Next Step in Online Money Management, Apr. 15, 1996, pp. 221–222.

PR Newswire, Industry Security Leader Racal Supports Visa/Mastercard Proposal for Internet, Apr. 17, 1996, pp. 152–153.

PR Newswire, Spyglass (TM) Supports Microsoft's ACTIVEX, SET, PCT and ISAPI With Introduction of New Spyglass Web Technology Kits, Apr. 23, 1996, pp. 132–133.

PR Newswire, Cybersource's New Internet Commerce Services Provide Software Publishers Turn–Key Electronic Transaction and Distribution Services; Qualcomm, Insignia, Wall Data and Seven Other Publishers Choose CyberSource to Distribute Products Via the Internet, Apr. 30, 1996, pp. 99–101.

PR Newswire, 1996 Olympic Games Web Site Proves a Successful as Venue for Olympic Ticket Sales; IBM–Developed Server Enables Secure Electronic Transactions for a Large Number of Consumers, May 1, 1996, pp. 83–84.

PR Newswire, Dynamic Duo Taxware and IBM; Partners on the Commerce.Net, May 1, 1996, pp. 85–86.

PR Newswire, DocuMagix Hotpage Available Now Online Via Software.Net; Software.Net Offers DocuMagix HotPage with Exclusive Custom Content, May 7, 1996, pp. 44–45.

PR Newswire, Netscape Announces Netscape Livepayment (TM) to Facilitate Internet Commerce; Leading Companies to Support Netscape's Open, Cross–Platform Softweare for Online Credit Card Processing, May 13, 1996, pp. 39–41.

Record, Security is Going on Line; Mastercard, Visa Agree on Standard, Feb. 2, 1996, pp. 73–75.

Reuters, Bank One Corp <One.N> Says Joins Commercenet, Oct. 17, 1994, p. 316.

Reuters, MasterCard, Visa to Set Electronic Standard NYT, Feb. 1, 1996, p. 160.

Reuters, Visa and Mastercard Adopt Joint Internet Standard, Feb. 1, 1996, pp. 164–165.

Reuters, GE<GE.N> Info Services Debuts net Commerce System, Feb. 6, 1996, pp. 24–25.

Reuters, AMEX <AXP.N>, Microsoft <MGFT.O> In Pact, Feb. 29, 1996, p. 442.

Reuters, Netscape<NSCP.O> Offers Secure Internet Collection, May 13, 1996, p. 42.

Reuter Business Report, America Online, Others Push for Net Security, Apr. 11, 1995, pp. 276–277.

Reuter Business Report, Visa and Mastercard Adopt Joint Internet Standard, Feb. 1, 1996, pp. 158–159.

Reuter Business Report, Mastercard, Visa to Set Electronic Standard NYT, Feb. 1, 1996, p. 157.

Reuter Business Report, Improving Internet Safety to Protect Commerce, Apr. 3, 1996, pp. 232–234.

Reuter European Business Report, America Online, Others Push for Net Security, Apr. 11, 1995, pp. 278–279.

Reuter European Business Report, Mastercard, Visa to Set Electronic Standard—NYT, Feb. 1, 1996, p. 161.

Reuter European Business Report, Visa and Mastercard Adopt Joint Internet Standard, Feb. 1, 1996, pp. 162–163.

Reuters World Service, MasterCard, Visa to Set Electronic Standard—NYT, Feb. 1, 1996, p. 169.

Risk Management, Are You Exposed on the Internet? Security Issues and Data Protection; Circuit Breakers, Apr. 1996, pp. 252–254.

Rocky Mountain News, Visa, MasterCard Agree on 'Net Security; Deal Allows to Offer Customers Greater Protection in On Line Services, Feb. 2, 1996, pp. 76–77.

Rocky Mountain News, The Web: It's Anybody's Business; Colorado Retailers and Service Companies Caught Up in Awesome Potential of Internet, Mar. 24, 1996, pp. 305–310.

Sacramento Bee, Credit Card Standard Set for Net, Feb. 23, 1996, pp. 78–79.

The San Diego Union–Tribune, Business; Ed. 1,2,3,4,5,6,7, 8, p. C–2, Mar. 1, 1996, pp. 423–424.

The San Francisco Chronicle, Mastercard, Visa Accord on Internet Credit–Card Giants Agree on a Security Standard, Feb. 1, 1996, pp. 137–138.

The San Francisco Examiner, Credit–Card Companies OK Internet Security Deal, Feb. 1, 1996, pp. 166–167.

The San Francisco Examiner, Infobahn leads to a Volvo Dealer, Mar. 1, 1996, pp. 297–298.

Seybold Report on Desktop Punlicshjing, Visa, MasterCard Adopt SET, Feb. 19, 1996, pp. 518–519.

South China Morning Post, Business; Banking; p. 7, Mar. 30, 1995, pp. 286–287.

Standard & Poor's Emerging & Special Situation, New Issues—Cybercash Avoid, Feb. 20, 1996, pp. 502–503.

The Straits Times (Singapore), Larger NetworkAsia Show This Year, Apr. 25, 1995, pp. 272–273.

The Straits Times (Singapore), Credit Card Firms Devise Joint Net Payment Scheme, Feb. 2, 1996, p. 81.

The Straits Times (Singapore), Music Scene Alive and Thriving Since the '30s, Feb. 6, 1996, pp. 26–27.

The Straits Times (Singapore), Concern Grows Over Credit Card Debts, Mar. 24, 1996, pp. 311–314.

Sunday Times, Credit Card Set Standard for Net Buys, Feb. 4, 1996, p. 44.

Telecomworldwire, Global Players Unite on Payment Standards, Feb. 1, 1996, p. 168.

Telecomworldwire, Sidewire: Science Applications International Corp, a US Provider of Information and Network, Mar. 1, 1996, p. 425.

Telecomworldwire, Adobe, Netscape Form Major Commercial Internet Publishing Plan, Apr. 4, 1995, p. 280.

The Toronto Star, Firm Unveils Secure Net Paying System, Mar. 27, 1996, pp. 287–288.

Origin Universal New Services Limited, Racal Supports the Visa/Mastercard Secure Electronics Transactions (SET), May 1, 1996, pp. 87–88.

Upside, The Cyber Bowl, Apr. 1996, pp. 255–266.

Upside, The Key to Security, Apr. 1996, pp. 267–276.

Upside, End of the Line for On–Line Services?, May 1996, pp. 89–98.

U.S. Banker, Card Pact Weaves A Tighter Net, Mar. 1996, p. 426.

Wall Street Journal, Visa, Mastercard Reach an Agreement for Single System of Internet Payment, Feb. 1, 1996, p. 170.

The Washington Post, Feb. 2, 1996, pp. 83–84.

The Washington Post, Give Us Some Credit: Your Card is Safe; There Are Many Very Good Reasons Not to Shop On–Line, Fear That Your Credit Card Number Will be Abused Should Not Be One of Them, Apr. 24, 1996.

The Washington Post, Who Was That Masked Cybershopper?; MasterCard–Visa Agreement on Credit Card Security May Make On–Line Commerce Fly, Feb. 2, 1996, p. 82.

Working Woman, Adventure On–Line . . . ; Using Online Services to Make Travel Arrangements, Apr. 1996, pp. 277–282.

Your Money, Brokers Not Equal When It Comes to Charging Customers, Mar. 16, 1996, pp. 331–337.

Your Money, Credit Card Fraud New Concern of Internet Business, Mar. 16, 1996, pp. 338–339.

Borenstein et al., MIME (Multipurpose Internet Mail Extensions) Part One: Mechanisms for Specifying and Describing the Format of Internet Message Bodies, Borenstein & Freed, Sep. 1993.

Fielding et al., Hypertext Transfer Protocol—HTTP/1.1, Fielding, Frystyk, Berners–Lee, Gettys and Mogul, May 2, 1996.

Fielding et al., Hypertext Transfer Protocol—HTTP/1.1, Fielding, Frystyk, Berners–Lee, Gettys and Mogul, Jun. 3, 1996.

An RSA Laboratories Technical Note, Version 1.5, Revised Nov. 1, 1993.

Internet Protocol, DARPA Internet Program Protocol Specification, University of Southern California, Sep. 1981.

Transmission Control Protocol, DARPA Internet Program Protocol Specification, University of Southern California, Sep. 1981.

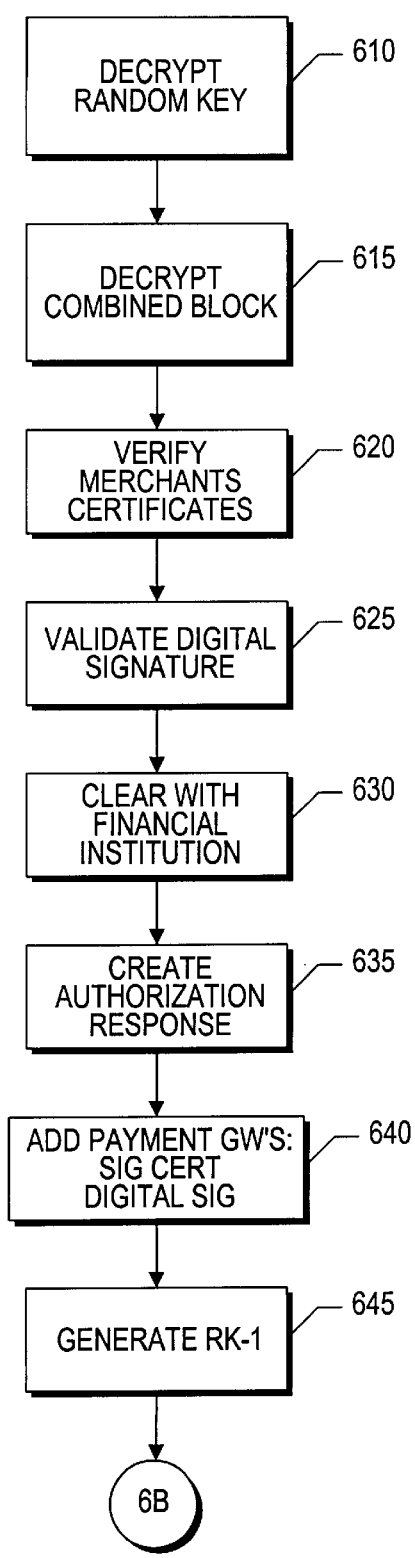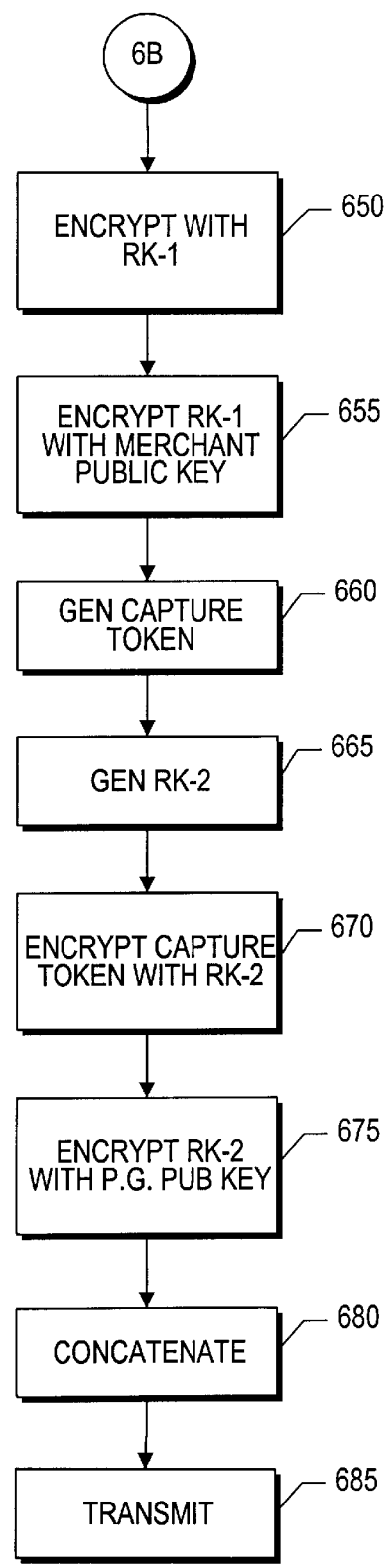
*FIG. 6A*  *FIG. 6B*

*FIG. 7A*
*FIG. 7F*
*FIG. 7G*
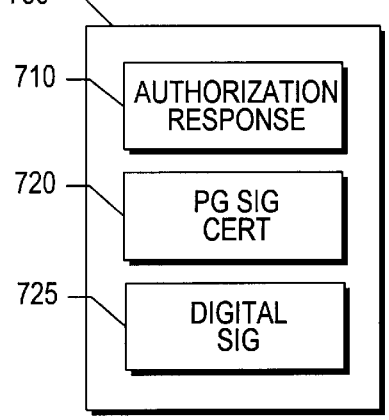
*FIG. 7B*
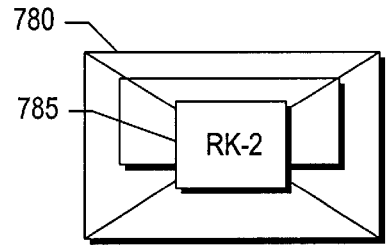
*FIG. 7H*
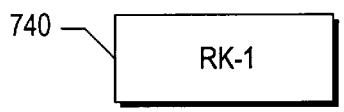
*FIG. 7C*
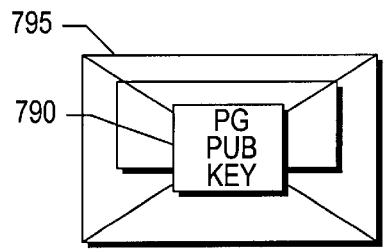
*FIG. 7I*
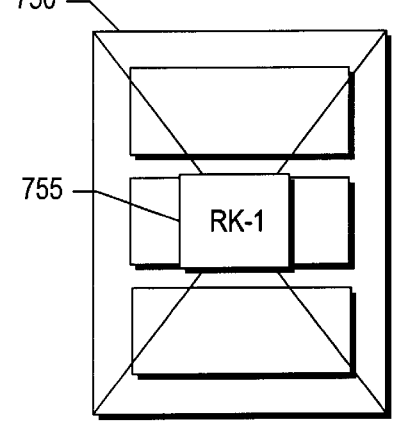
*FIG. 7D*
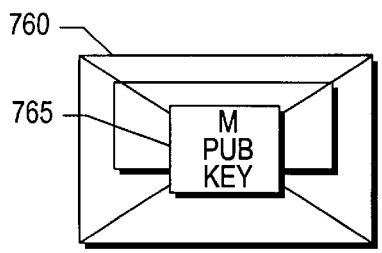
*FIG. 7E*
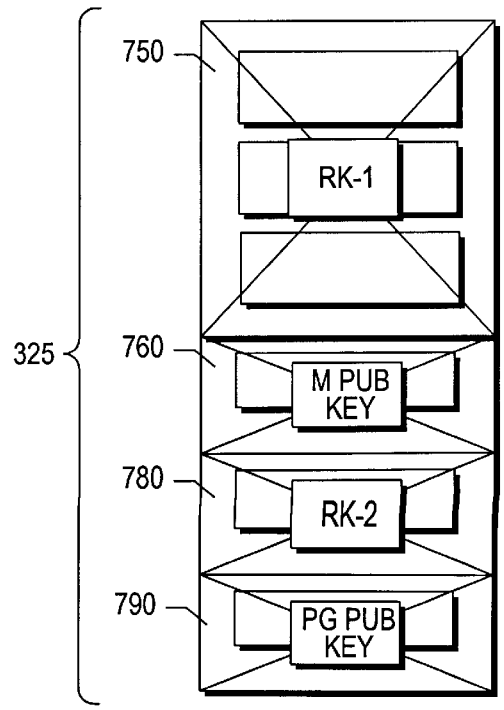
*FIG. 7J*

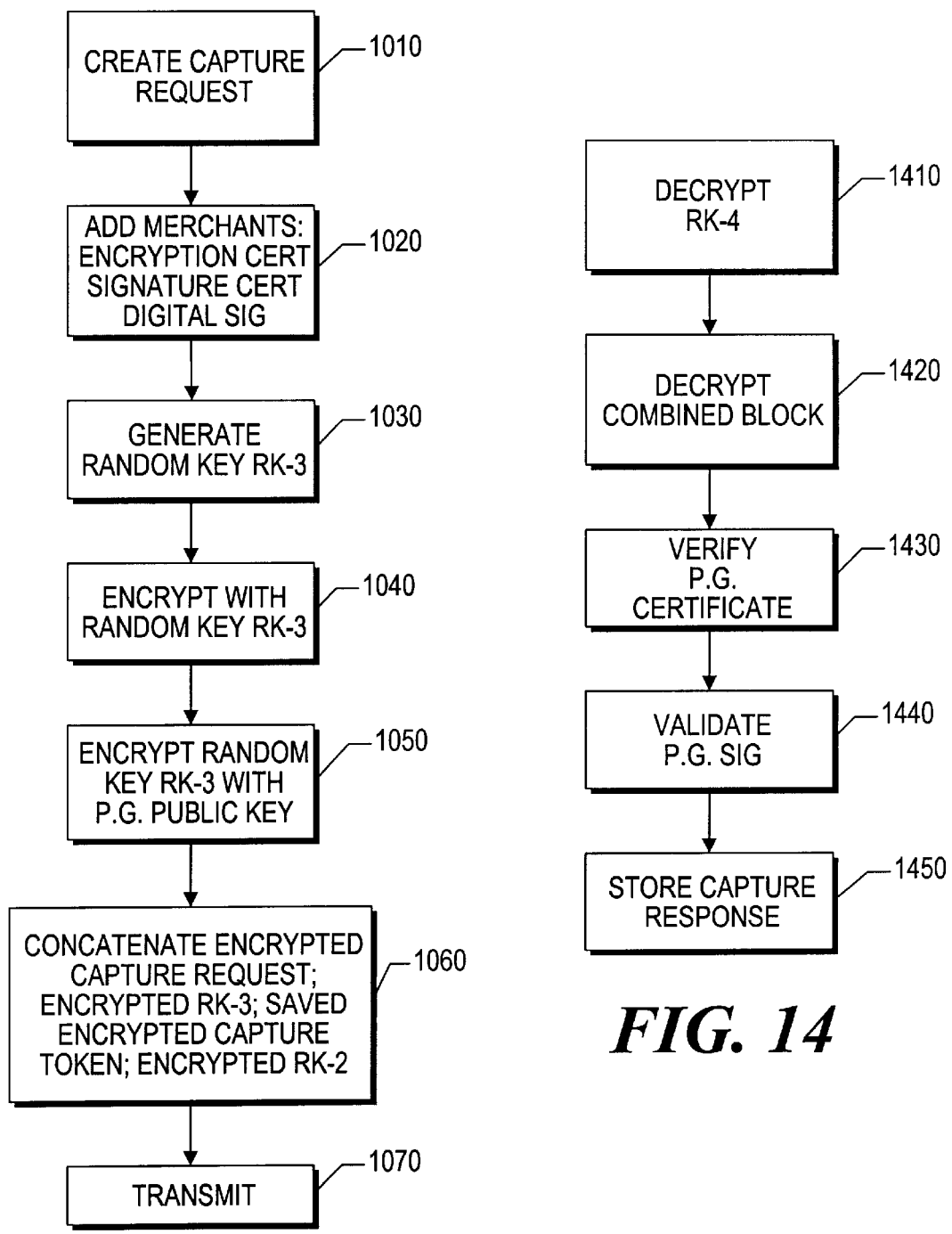

SYSTEM, METHOD AND ARTICLE OF MANUFACTURE FOR SECURE NETWORK ELECTRONIC PAYMENT AND CREDIT COLLECTION

FIELD OF THE INVENTION

The present invention relates to the electronic payment in exchange for goods and services purchased over a communication network, and more specifically, and more particularly, to a system, method and article of manufacture for securely transmitting payment information from a customer to a merchant to a payment gateway and returning appropriate, secure authorization to the merchant and the customer.

BACKGROUND OF THE INVENTION

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable to have the ability for the merchant to transmit information, including a subset of the information provided by the customer, over such a network to a payment gateway computer system that is authorized, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art will readily comprehend that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer. A drawback to the secure payment technology approach is that it requires deployment of special-purpose software compliant with the particular secure payment technology to the customer, thereby limiting user acceptance of the secure payment technology to those customers willing to install that software. Customers are generally reluctant to install such specialized software in the absence of a general acceptance of merchant software and payment gateway software that incorporate the corresponding secure payment technology with which to interact. Similarly, merchants and payment gateways are reluctant to implement a secure payment technology in the absence of an installed customer base that is available to use that secure payment technology. This presents a "chicken-and-the-egg" problem in that no particular component of a secure payment technology is likely to achieve general acceptance until the other components also achieve general acceptance.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), *The SSL Protocol Version 3.0*, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Theresa Systems, Shen, Kerberos, Photuris, Pretty Good Privacy ("PGP") and Ipv6 which meets the IPSEC criteria. One of ordinary skill in the art will readily comprehend that any of the general-purpose secure communication protocols can be substituted for the SSL transmission protocol without undue experimentation.

OBJECTS OF THE INVENTION

It is desirable to provide a hybrid approach that encourages the deployment of a three-party secure channel such as SET by payment gateways in the absence of customer acceptance, thereby providing customers with an incentive to install SET-compliant software on their computer systems. It is further desirable to provide a means by which a merchant may communicate with a customer using a readily deployed secure channel such SSL or another general-purpose secure communication protocol, and communicate with a payment gateway using a modified SET-like protocol that is not dependent upon customer certification.

SUMMARY OF THE INVENTION

According to a broad aspect of a preferred embodiment of the invention, secure transmission of data is provided between a plurality of computer systems over a public communication system, such as the Internet. Secure transmission of data is provided from a customer computer system to a merchant computer system, and for the further secure transmission of data from the merchant computer system to a payment gateway computer system. The payment gateway system evaluates the information and returns authorization or denial of credit via a secure transmission to the merchant which is communicated to the customer by the merchant.

DESCRIPTION OF THE DRAWINGS

The foregoing and other objects, aspects and advantages are better understood from the following detailed description of a preferred embodiment of the invention with reference to the drawings, in which:

FIGS. 6A and 6B depict the detailed steps of processing a payment authorization request and generating and transmitting a payment authorization request response in accordance with a preferred embodiment;

FIGS. 7A through 7J depict views of the payment authorization response and its component parts in accordance with a preferred embodiment;

FIG. 10 depicts the detailed steps of generating and transmitting a payment capture request in accordance with a preferred embodiment;

FIG. 14 depicts the detailed steps of processing a payment capture response in accordance with a preferred embodiment.

DETAILED DESCRIPTION

Figure 1A:
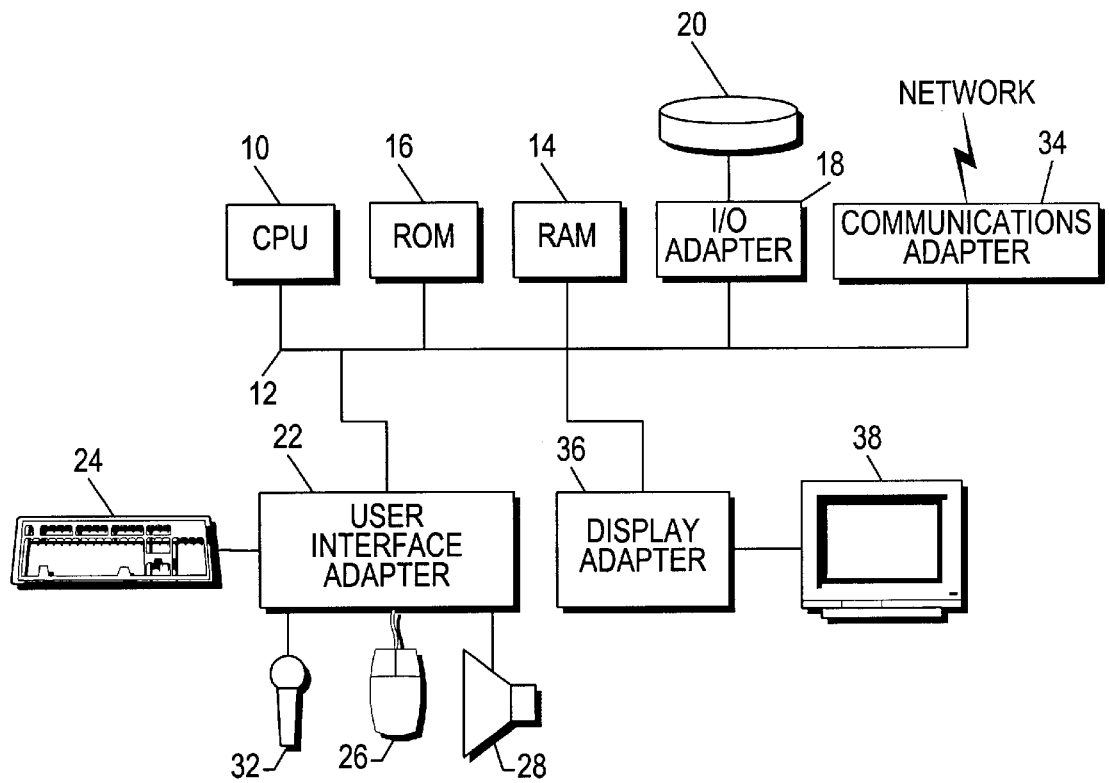
FIG. 1A is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX could be substituted for JAVA without undue experimentation to practice the invention.

Figure 1B:
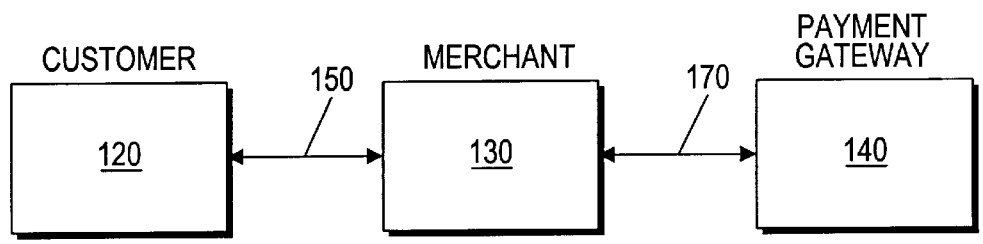
FIG. 1B depicts an overview in accordance with a preferred embodiment.
Figure 1C:
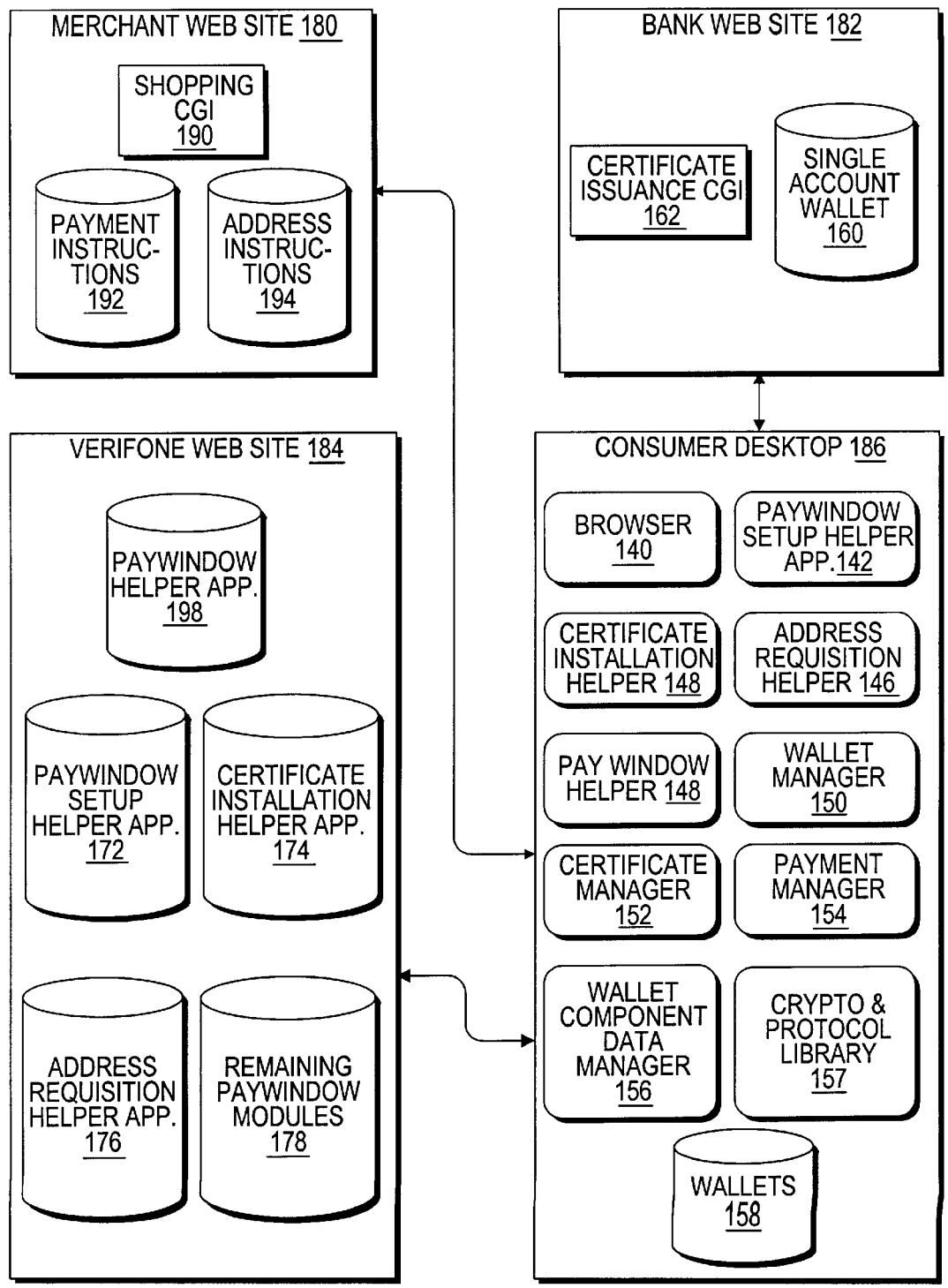

FIG. 1B depicts an overview of the present invention. Customer computer system 120 is in communication with merchant computer system 130. The customer-merchant session 150 operates under a general-purpose secure communication protocol such as the SSL protocol. Merchant computer system 130 is additionally in communication with payment gateway computer system 140. A payment gateway is a system that provides electronic commerce services in support of a bank or other financial institution, and that interfaces to the financial institution to support the authorization and capture of transactions. The merchant-institution session 170 operates under a variant of a secure payment technology such as the SET protocol, as described herein, referred to as Merchant-Originated Secure Electronic Transactions ("MOSET"), as is more fully described herein.

Customer-to-Merchant Communication

Figure 2:
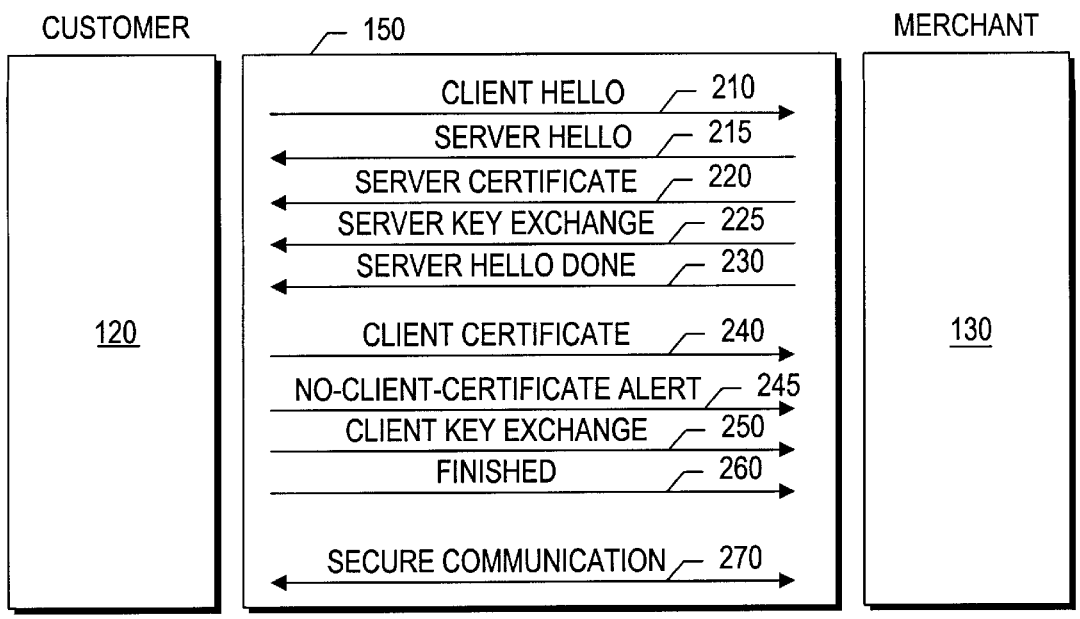
FIG. 2 depicts a more detailed view of a customer computer system in communication with merchant system under the Secure Sockets Layer protocol in accordance with a preferred embodiment.

FIG. 2 depicts a more detailed view of customer computer system 120 in communication with merchant system 130 using customer-merchant session 150 operating under the SSL protocol as documented in Freier and incorporated by reference.

Customer computer system 120 initiates communication with merchant computer system 130 using any well-known access protocol, e.g., Transmission Control Protocol/Internet Protocol ("TCP/IP"). In this implementation, customer computer system 120 acts as a client and merchant computer system 130 acts as a server.

Customer computer system 120 initiates communication by sending "client hello" message 210 to the merchant computer system 130. When a client first connects to a server it is required to send the client hello message 210 as its first message. The client can also send a client hello message 210 in response to a hello request on its own initiative in order to renegotiate the security parameters in an existing connection. The client hello message includes a random structure, which is used later in the protocol. Specifically, the random structure includes the current time and date in standard UNIX 32-bit format according to the sender's internal clock and twenty-eight bytes of data generated by a secure random number generator. The client hello message 210 further includes a variable length session identifier. If not empty, the session identifier value identifies a session between the same client and server whose security parameters the client wishes to reuse. The session identifier may be from an earlier connection, the current connection, or another currently active connection. It is useful to specify the current connection if the client only wishes to update the random structures and derived values of a connection. It is useful to specify another currently active connection if the client wishes to establish several simultaneous independent secure connections to the same server without repeating the full handshake protocol. Client hello message 210 further includes an indicator of the cryptographic algorithms supported by the client in order of the client's preference, ordered according to client preference.

In response to client hello message 210, if merchant computer system 130 wishes to correspond with customer computer system 120, it responds with server hello message 215. If merchant computer system 130 does not wish to communicate with customer computer system 120, it responds with a message, not shown, indicating refusal to communicate.

Server hello message 215 includes a random structure, which is used later in the protocol. The random structure in server hello message 215 is in the same format as, but has contents independent of, the random structure in client hello message 210. Specifically, the random structure includes the current time and date in standard UNIX 32-bit format according to the sender's internal clock and twenty-eight bytes of data generated by a secure random number generator. Server hello message 215 further includes a variable length session identifier. The session identifier value identifies a new or existing session between the same client and server. Server hello message 215 further includes an indicator of the cryptographic algorithms selected from among the algorithms specified by client hello message 210, which will be used in further encrypted communications.

Optionally, Merchant computer system 130 transmits a server certificate 220. If transmitted, server certificate 220 enables customer computer system 120 to authenticate the identity of merchant computer system 130.

If merchant computer system 130 does not transmit a server certificate 220, or if server certificate 220 is suitable only for authentication, it may optionally transmit a server key exchange message 225. Server key exchange message 225 identifies a key that may be used by customer computer system 120 to decrypt further messages sent by merchant computer system 130.

After transmitting server hello message 215, and optionally transmitting server certificate 220 or server key exchange message 225, merchant computer system 130 transmits a server hello done message 230 and waits for a further response from customer computer system 120.

Customer computer system 120 optionally transmits client certificate 240 to merchant computer system 130. If transmitted, client certificate 240 enables merchant computer system 130 to authenticate the identity of customer computer system 120. Alternatively, customer computer system 120 may transmit a no-client-certificate alert 245, to indicate that the customer has not registered with any certification authority.

If customer computer system 120 does not transmit a client certificate 240, or if client certificate 240 is suitable only for authentication, customer computer system 120 may optionally transmit a client key exchange message 250. Client key exchange message 250 identifies a key that may be used by merchant computer system 130 to decrypt further messages sent by customer computer system 120.

After optionally transmitting client certificate 240, no-client-certificate alert 245, and/or client key exchange message 250, customer computer system 120 transmits a finished message 260.

At this point, customer computer system 120 and merchant computer system 130 have:

1) negotiated an encryption scheme that may be commonly employed in further communications, and
2) have communicated to each other a set of encryption keys that may be used to decrypt further communications between the two computer systems.

Customer computer system 120 and merchant computer system 130 may thereafter engage in secure communications 270 with less risk of interception by third parties.

Among the messages communicated by customer computer system 120 to merchant computer system 130 may be messages that specify goods or services to be ordered and payment information, such as a credit card number and related information, collectively referred to as "payment information," that may be used to pay for the goods and/or services ordered. In order to obtain payment, the merchant must supply this information to the bank or other payment gateway responsible for the proffered payment method. This enables the merchant to perform payment authorization and payment capture. Payment authorization is the process by which permission is granted by a payment gateway operating on behalf of a financial institution to authorize payment on behalf of the financial institution. This is a process that assesses transaction risk, confirms that a given transaction does not raise the account holder's debt above the account's credit limit, and reserves the specified amount of credit. Payment capture is the process that triggers the movement of funds from the financial institution to the merchant's account.

Payment Authorization

Figure 3:
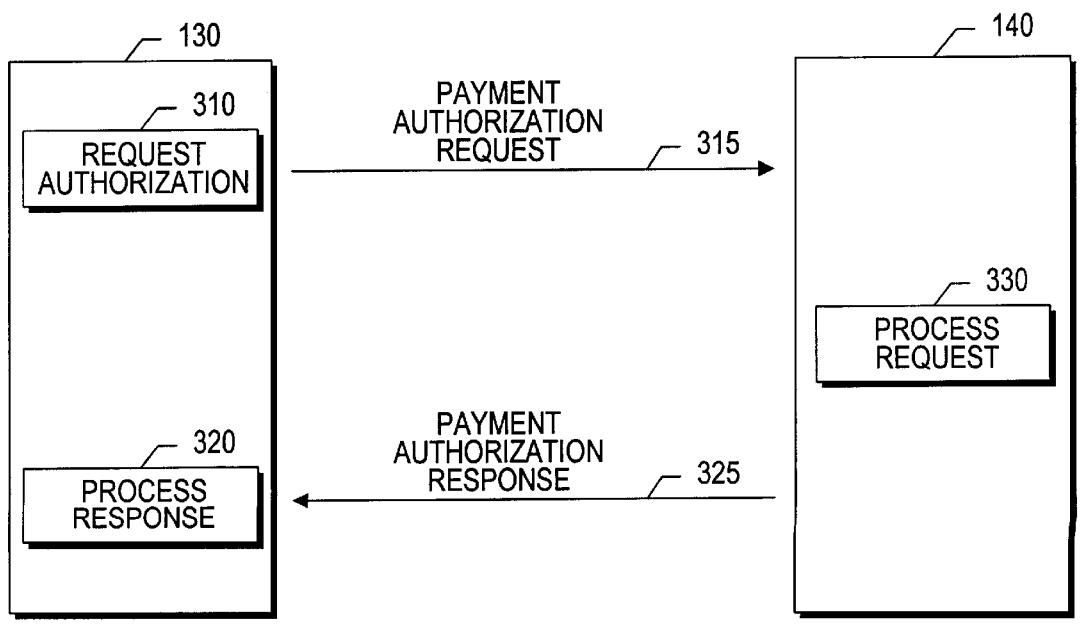
FIG. 3 depicts an overview of the method of securely supplying payment information to a payment gateway in order to obtain payment authorization in accordance with a preferred embodiment.

FIG. 3 depicts an overview of the method of securely supplying payment information to a payment gateway in order to obtain payment authorization. In function block 310, merchant computer system 130 generates a payment authorization request 315 and transmits it to payment gateway computer system 140. In function block 330, payment gateway system 140 processes the payment authorization request, generates a payment authorization response 325 and transmits it to merchant computer system 130. In function block 320, merchant computer system 130 processes payment authorization response 325 and determines whether payment for the goods or services sought to be obtained by the customer has been authorized.

Payment Authorization Request Generation

Figure 4:
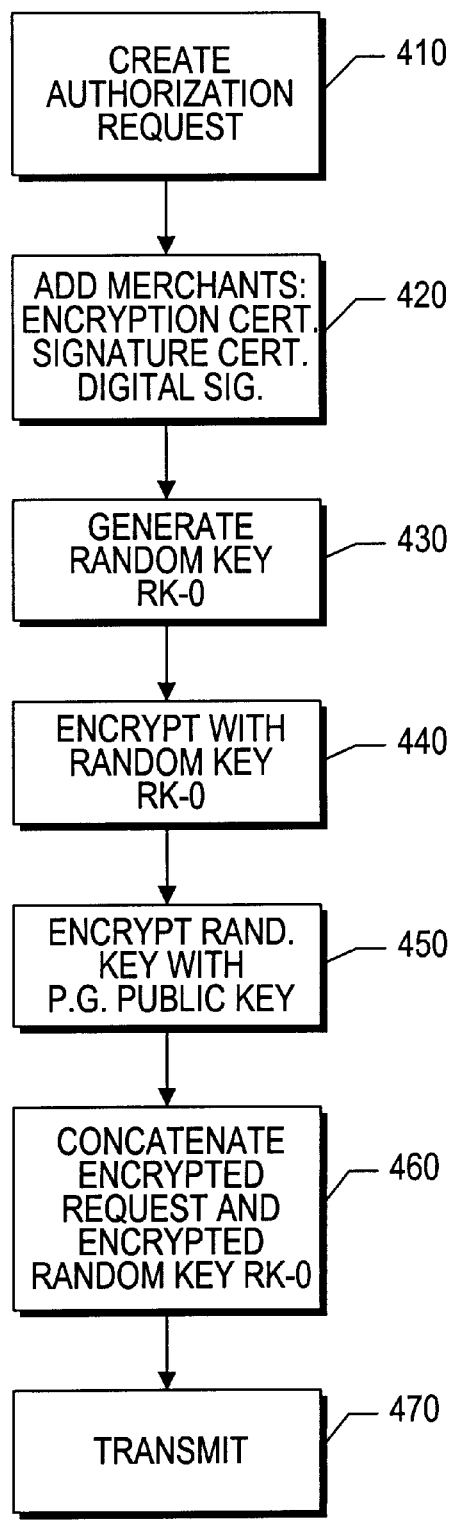
FIG. 4 depicts the detailed steps of generating and transmitting a payment authorization request in accordance with a preferred embodiment.
Figure 5A:
FIGS. 5A through 5F depict views of the payment authorization request and its component parts in accordance with a preferred embodiment.

FIG. 4 depicts the detailed steps of generating and transmitting a payment authorization request. FIGS. 5A through 5F depict views of the payment authorization request and its component parts. In function block 410, merchant computer system 130 creates a basic authorization request 510. The basic authorization request 510 is a data area that includes all the information for determining whether a request should be granted or denied. Specifically, it includes such information as the party who is being charged, the amount to be charged, the account number of the account to be charged, and any additional data, such as passwords, needed to validate the charge. This information is either calculated based upon prior customer merchandise selection, or provided by the customer over the secure link 270 established in the customer-merchant general-purpose secure communication protocol session. FIG. 5A depicts a basic authorization request 510.

In function block 420, merchant computer system 130 combines basic authorization request 510, a copy of its encryption public key certificate 515 and a copy of its signature public key certificate 520. Merchant computer system 130 calculates a digital signature 525 for the combined contents of the combined block 530 comprising basic authorization request 510, the encryption public key certificate 515 and the signature public key certificate 520, and appends it to the combination of the combined basic authorization request 510, the encryption public key certificate 515 and the signature public key certificate 520. The merchant computer system calculates digital signature 525 by first calculating a "message digest" based upon the contents of the combined basic authorization request 510, the encryption public key certificate 515 and the signature public key certificate 520. A message digest is the fixed-length result that is generated when a variable length message is fed into a one-way hashing function. Message digests help verify that a message has not been altered because altering the message would change the digest. The message digest is then encrypted using the merchant computer system's 130 digital signature private key, thus forming a digital signature.

Figure 5B:
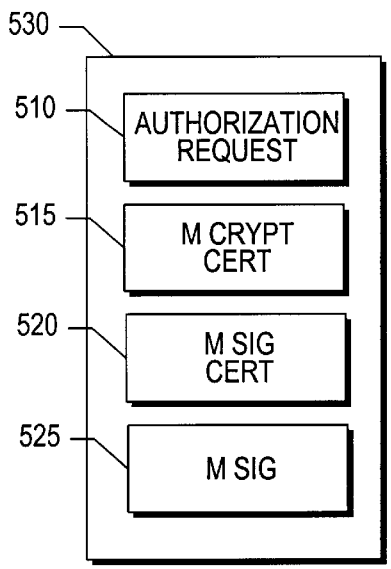

FIG. 5B depicts the combined block 530 formed by function block 420 and containing basic authorization request 510, the encryption public key certificate 515, the signature public key certificate 520, and digital signature 525.

Figure 5C:

In function block 430, merchant computer system 130 generates a random encryption key RK-0 540, denoted as RK-0. Random encryption key RK-0 540 is a symmetric encryption key. A symmetric encryption key is a key characterized by the property that a message encrypted with a symmetric key can be decrypted with that same key. This is contrasted with an asymmetric key pair, such as a public-key/private-key key pair, where a message encrypted with one key of the key pair may only be decrypted with the other key of the same key pair. FIG. 5C depicts random encryption key RK-0 540.

Figure 5D:
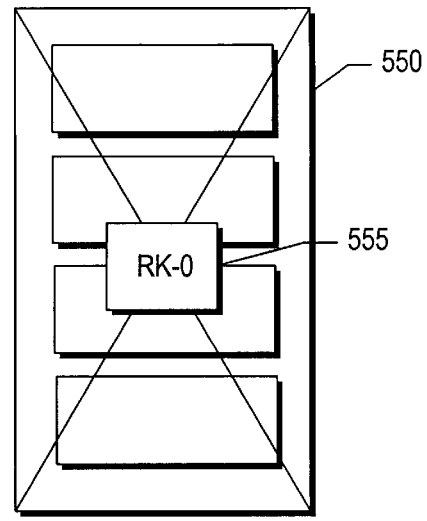

In function block 440, merchant computer system 130 encrypts combined block 530 using random encryption key RK-0 540 to form encrypted combined block 550. FIG. 5D depicts encrypted combined block 550. The encryption state of encrypted combined block 550 is graphically shown by random key lock 555, which indicates that encrypted combined block 550 is encrypted using random key RK-0 540.

Figure 5E:
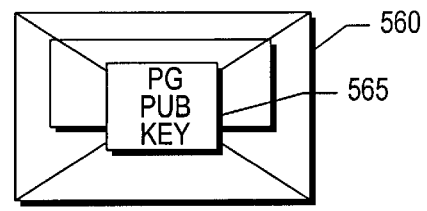

In function block 450, merchant computer system 130 encrypts random encryption key RK-0 540 using the public key of payment gateway system 140 to form encrypted random key 560. FIG. 5E depicts encrypted random key 560. The encryption state of encrypted random key 560 is graphically shown by payment gateway public key lock 565, which indicates that encrypted random key 560 is encrypted using the payment gateway public key.

Figure 5F:
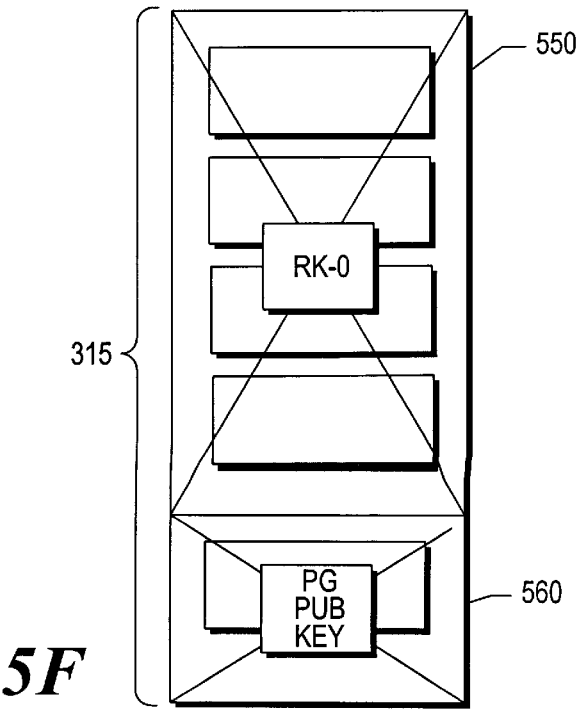

In function block 460, merchant computer system 130 concatenates encrypted combined block 550 and encrypted random key 560 to form merchant authorization request 315. FIG. 5F depicts merchant authorization request 315 comprising encrypted combined block 550 and encrypted random key 560. In function block 470, merchant computer system 130 transmits merchant authorization request 315 to payment gateway system 140.

Payment Authorization Request Processing

FIG. 6 depicts the detailed steps of processing a payment authorization request and generating and transmitting a payment authorization request response. Function blocks 610 through 630 depict the steps of processing a payment authorization request, while function blocks 635 through 685 depict the steps of generating and transmitting a payment authorization request response.

In function block 610, payment gateway computer system 140 applies its private key to encrypted random key 560 contained within received merchant authorization request 315, thereby decrypting it and obtaining a cleartext version of random key RK-0 540. In function block 615, payment gateway computer system 140 applies random key RK-0 540 to encrypted combined block 550, thereby decrypting it and obtaining a cleartext version of combined block 530. It will be recalled that combined block 530 comprises basic authorization request 510, a copy of merchant computer system's 130 encryption public key certificate 515 and a copy of merchant computer system's 130 signature public key certificate 520, as well as merchant digital signature 525.

In function block 620, payment gateway computer system 140 verifies merchant computer system's 130 encryption public key certificate 515 and merchant computer system's 130 signature public key certificate 520. Payment gateway computer system 140 performs this verification by making a call to the certification authorities associated with each certificate. If verification of either certificate fails, payment gateway computer system 140 rejects the authorization request.

In function block 625, payment gateway computer system 140 validates merchant digital signature 525. Payment gateway computer system 140 performs this validation by calculating a message digest over the contents of the combined basic authorization request 510, the encryption public key certificate 515 and the signature public key certificate 520. Payment gateway computer system 140 then decrypts digital signature 525 to obtain a copy of the equivalent message digest calculated by merchant computer system 130 in function block 420. If the two message digests are equal, the digital signature 525 is validated. If validation fails, payment gateway computer system 140 rejects the authorization request.

In function block 630, payment gateway computer system 140 determines the financial institution for which authorization is required by inspection of basic authorization request 510. Payment gateway computer system 140 contacts the appropriate financial institution using a secure means, e.g., a direct-dial modem-to-modem connection, or a proprietary internal network that is not accessible to third parties, and using prior art means, obtains a response indicating whether the requested payment is authorized.

Payment Authorization Response Generation

Function blocks 635 through 685 depict the steps of generating and transmitting a payment authorization request response. FIGS. 7A through 7J depict views of the payment authorization response and its component parts.

In function block 635, payment gateway computer system 140 creates a basic authorization response 710. The basic authorization request is a data area that includes all the information to determine whether a request was granted or denied. FIG. 7A depicts basic authorization response 710.

In function block 640, payment gateway computer system 140 combines basic authorization response 710, and a copy of its signature public key certificate 720. Payment computer system 140 calculates a digital signature 725 for the combined contents of the combined block 730 comprising basic authorization response 710 and the signature public key certificate 720, and appends the signature to the combination of the combined basic authorization response 710 and the signature public key certificate 720. The payment gateway computer system calculates digital signature 725 by first calculating a message digest based on the contents of the combined basic authorization response 710 and signature public key certificate 720. The message digest is then encrypted using the merchant computer system's 130 digital signature private key, thus forming a digital signature.

FIG. 7B depicts the combined block 730 formed in function block 640 and containing basic authorization response 710, the signature public key certificate 720, and digital signature 725.

In function block 645, payment gateway computer system 140 generates a first symmetric random encryption key 740, denoted as RK-1. FIG. 7C depicts first random encryption key RK-1 740.

In function block 650, payment gateway computer system 140 encrypts combined block 730 using random encryption key RK-1 740 to form encrypted combined block 750. FIG. 7D depicts encrypted combined block 750. The encryption state of encrypted combined block 750 is graphically shown by random key lock 755, which indicates that encrypted combined block 750 is encrypted using random key RK-1 740.

In function block 655, payment gateway computer system 140 encrypts random encryption key RK-1 740 using the public key of merchant computer system 130 to form encrypted random key RK 760. FIG. 7E depicts encrypted random key RK-1 760. The encryption state of encrypted random key 760 is graphically shown by merchant public key lock 765, which indicates that encrypted random key 760 is encrypted using the merchant public key.

In function block 660, payment gateway computer system 140 generates a random capture token 770. Random capture token 770 will be used in subsequent payment capture processing to associate the payment capture request with the payment authorization request being processed. FIG. 7F depicts capture token 775.

In function block 665, payment gateway computer system 140 generates a second symmetric random encryption key 775, denoted as RK-2. FIG. 7G depicts second random encryption key RK-2 775.

In function block 670, payment gateway computer system 140 encrypts capture token 770 using random encryption key RK-2 770 to form encrypted capture token 780. FIG. 7H depicts encrypted capture token 780. The encryption state of encrypted capture token 780 is graphically shown by random key lock 785, which indicates that encrypted capture token 780 is encrypted using random key RK-2 770.

In function block 675, payment gateway computer system 140 encrypts second random encryption key RK-2 775 using its own public key to form encrypted random key RK-2 790. FIG. 7I depicts encrypted random key RK-2 790. The encryption state of encrypted random key 790 is graphically shown by payment gateway public key lock 795, which indicates that encrypted random key 790 is encrypted using the payment gateway public key.

In function block 680, payment gateway computer system 140 concatenates encrypted combined block 750, encrypted random key RK-1 760, encrypted capture token 780 and encrypted random key RK-2 790 to form merchant authorization response 325. FIG. 7J depicts merchant authorization response 325 comprising encrypted combined block 750, encrypted random key RK-1 760, encrypted capture token 780 and encrypted random key RK-2 790. In function block 685, payment gateway computer system 140 transmits merchant authorization response 325 to merchant system 130.

Payment Authorization Response Processing

Figure 8:
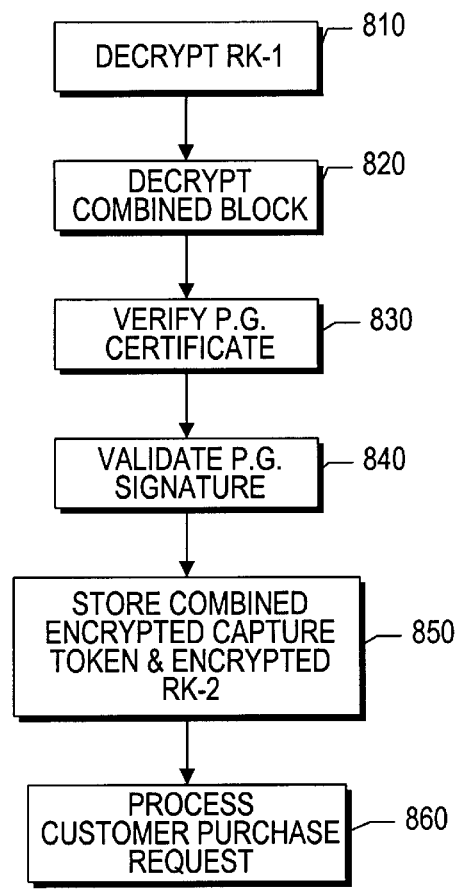
FIG. 8 depicts the detailed steps of processing a payment authorization response in accordance with a preferred embodiment.

FIG. 8 depicts the detailed steps of processing a payment authorization response. In function block 810, merchant computer system 130 applies its private key to encrypted random key RK-1 760 contained within received merchant authorization response 325, thereby decrypting it and obtaining a cleartext version of random key RK-1 740.

In function block 820, merchant computer system 130 applies random key RK-1 740 to encrypted combined block 750, thereby decrypting it and obtaining a cleartext version of combined block 730. It will be recalled that combined block 730 comprises basic authorization response 710, a copy of payment gateway computer system's 140 signature public key certificate 720, as well as payment gateway digital signature 725.

In function block 830, merchant computer system 130 verifies payment gateway computer system's 140 signature public key certificate 720. Merchant computer system 130 performs this verification by making a call to the certification authority associated with the certificate. If verification of the certificate fails, merchant computer system 130 concludes that the authorization response is counterfeit and treats it as though the authorization request had been rejected.

In function block 840, merchant computer system 130 validates payment gateway digital signature 725. Merchant computer system 130 performs this validation by calculating a message digest over the contents of the combined basic authorization request 710 and the signature public key certificate 720. Merchant computer system 130 then decrypts digital signature 725 to obtain a copy of the equivalent message digest calculated by payment gateway computer system 140 in function block 640. If the two message digests are equal, the digital signature 725 is validated. If validation fails, concludes that the authorization response is counterfeit and treats it though the authorization request had been rejected.

In function block 850, merchant computer system 130 stores encrypted capture token 780 and encrypted random key RK-2 790 for later use in payment capture. In function block 860, merchant computer system 130 processes the customer purchase request in accordance with the authorization response 710. If the authorization response indicates that payment in authorized, merchant computer system 130 fills the requested order. If the authorization response indicates that payment is not authorized, or if merchant computer system 130 determined in function block 830 or 840 that the authorization response is counterfeit, merchant computer system 130 indicates to the customer that the order cannot be filled.

Payment Capture

Figure 9:
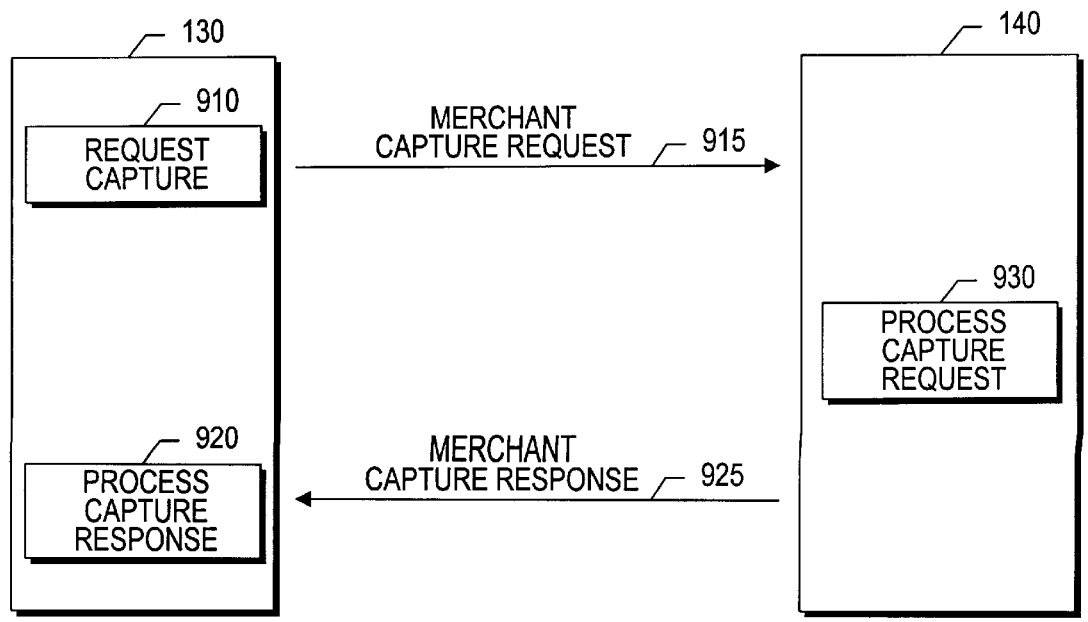
FIG. 9 depicts an overview of the method of securely supplying payment capture information to a payment gateway in accordance with a preferred embodiment.

FIG. 9 depicts an overview of the method of securely supplying payment capture information to payment gateway 140 in order to obtain payment capture. In function block 910, merchant computer system 130 generates a merchant payment capture request 915 and transmits it to payment gateway computer system 140. In function block 930, payment gateway system 140 processes the payment capture request 915, generates a payment capture response 925 and transmits it to merchant computer system 130. In function block 920, merchant computer system 130 processes payment capture response 925 and verifies that payment for the goods or services sought to be obtained by the customer have been captured.

Payment Capture Request Generation

FIG. 10 depicts the detailed steps of generating and transmitting a payment capture request. FIGS. 11A through 11F depict views of the payment capture request and its component parts. In function block 1010, merchant computer system 130 creates a basic capture request 1110. The basic capture request is a data area that includes all the information needed by payment gateway computer system 140 to trigger a transfer of funds to the merchant operating merchant computer system 130.

Figure 11A:
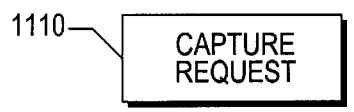
FIGS. 11A through 11F depict views of the payment capture request and its component parts in accordance with a preferred embodiment.

Specifically, a capture request includes a capture request amount, a capture token, a date, summary information of the purchased items and a Merchant ID (MID) for the particular merchant. FIG. 11A depicts basic ccpture request 1110.

In function block 1020, merchant computer system 130 combines basic capture request 1110, a copy of its encryption public key certificate 1115 and a copy of its signature public key certificate 1120. Merchant computer system 130 calculates a digital signature 1125 for the combined contents of the combined block 1130 comprising basic capture request 1110, the encryption public key certificate 1115 and the signature public key certificate 1120, and appends it to the combination of the combined basic capture request 1110, the encryption public key certificate 1115 and the signature public key certificate 1120. The merchant computer system calculates digital signature 1125 by first calculating a message digest over the contents of the combined basic capture request 1110, the encryption public key certificate 1115 and the signature public key certificate 1120. The message digest is then encrypted using the merchant computer system's 130 digital signature private key, thus forming a digital signature.

Figure 11B:
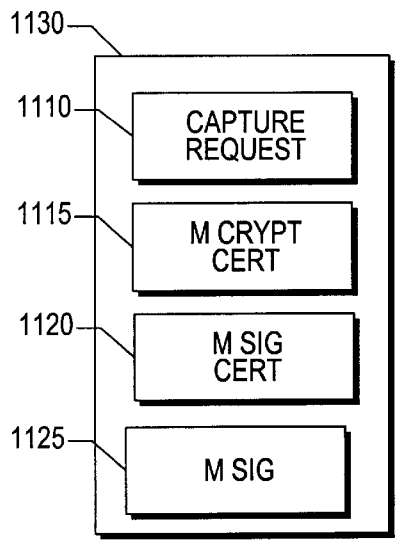

FIG. 11B depicts the combined block 1130 formed by function block 1020 and containing basic capture request 1110, the encryption public key certificate 1115, the signature public key certificate 1120, and digital signature 1125.

Figure 11C:
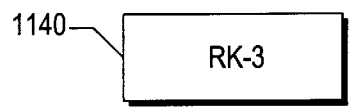

In function block 1030, merchant computer system 130 generates a random encryption key 1140, denoted as RK-3. Random encryption key RK-3 1140 is a symmetric encryption key. FIG. 11C depicts random encryption key RK-3 1140.

Figure 11D:
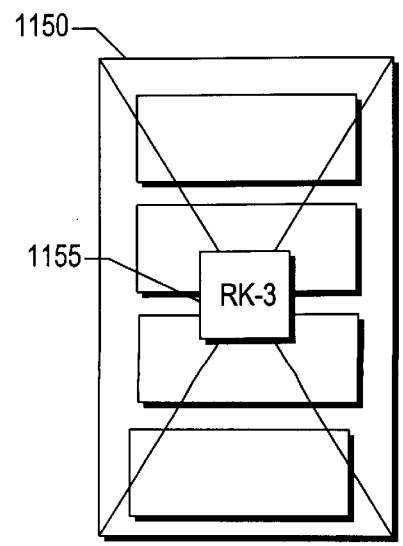

In function block 1040, merchant computer system 130 encrypts combined block 1130 using random encryption key RK-3 1140 to form encrypted combined block 1150. FIG. 11D depicts encrypted combined block 1150. The encryption state of encrypted combined block 1150 is graphically shown by random key lock 1155, which indicates that encrypted combined block 1150 is encrypted using random key RK-3 1140.

Figure 11E:
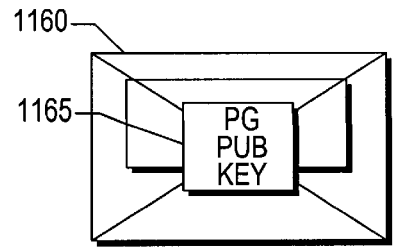

In function block 1050, merchant computer system 130 encrypts random encryption key RK-3 1140 using the public key of payment gateway system 140 to form encrypted random key 1160. FIG. 11E depicts encrypted random key 1160. The encryption state of encrypted random key 1160 is graphically shown by payment gateway public key lock 1165, which indicates that encrypted random key RK-3 1160 is encrypted using the payment gateway public key.

Figure 11F:
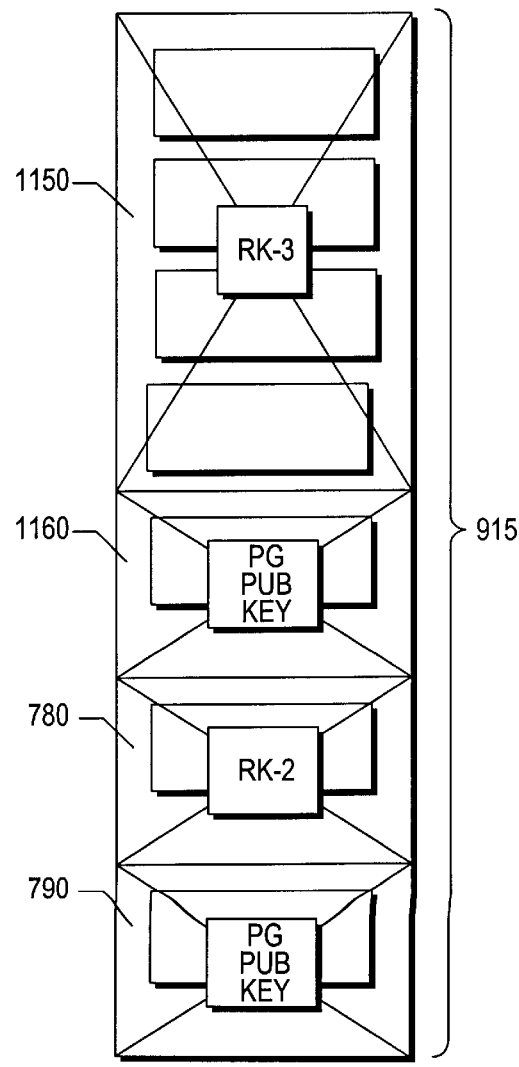

In function block 1060, merchant computer system 130 concatenates encrypted combined block 1150, encrypted random key 1160, and the encrypted capture token 780 and encrypted random key RK-2 790 that were stored in function block 850 to form merchant capture request 915. FIG. 11F depicts merchant capture request 915, comprising encrypted combined block 1150, encrypted random key 1160, encrypted capture token 780 and encrypted random key RK-2 790. In function block 1070, merchant computer system 130 transmits merchant capture request 915 to payment gateway system 140.

Payment Capture Request Processing

Figure 12A:
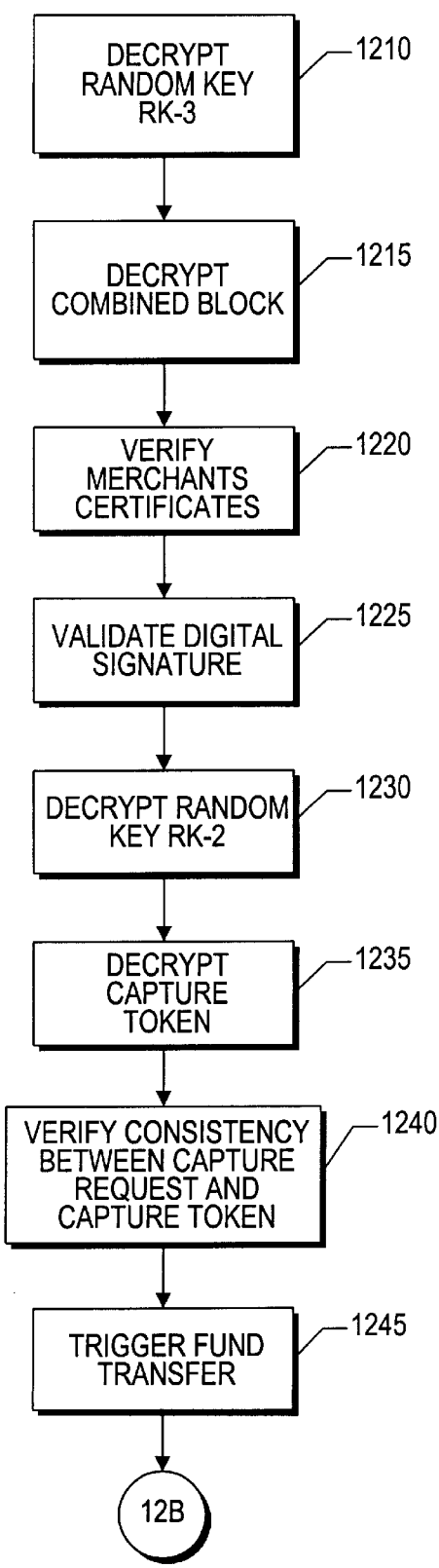
FIGS. 12A and 12B depict the detailed steps of processing a payment capture request and generating and transmitting a payment capture request response in accordance with a preferred embodiment.
Figure 12B:
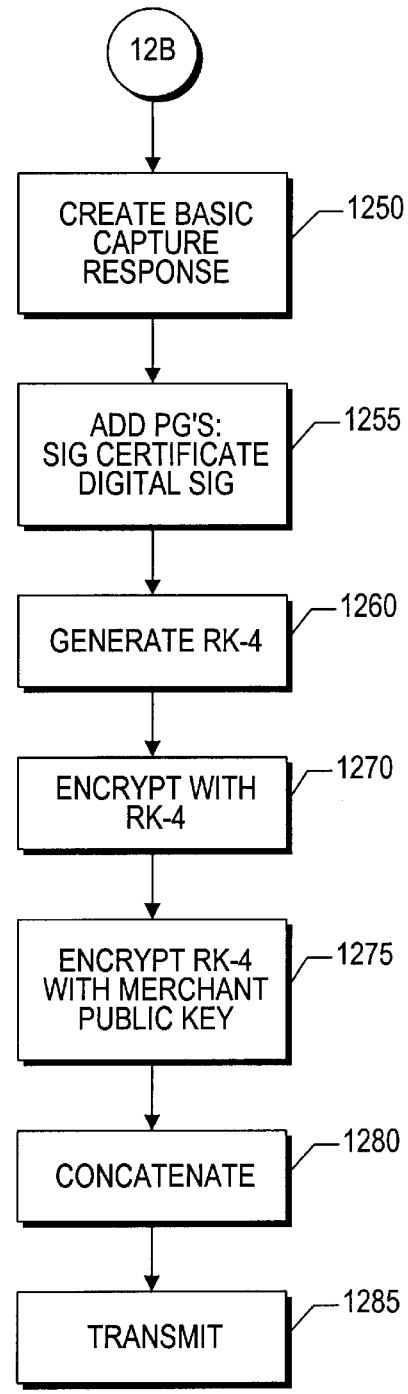

FIG. 12 depicts the detailed steps of processing a payment capture request and generating and transmitting a payment capture request response. Function blocks 1210 through 1245 depict the steps of processing a payment capture request, while function blocks 1250 through 1285 depict the steps of generating and transmitting a payment capture request response.

In function block 1210, payment gateway computer system 140 applies its private key to encrypted random key 1160 contained within received merchant capture request 915, thereby decrypting it and obtaining a cleartext version of random key RK-3 1140. In function block 1215, payment gateway computer system 140 applies random key RK-3 1140 to encrypted combined block 1150, thereby decrypting it and obtaining a cleartext version of combined block 1130. It will be recalled that combined block 1130 comprises basic capture request 1110, a copy of merchant computer system's 130 encryption public key certificate 1115 and a copy of merchant computer system's 130 signature public key certificate 1120, as well as merchant digital signature 1125.

In function block 1220, payment gateway computer system 140 verifies merchant computer system's 130 encryption public key certificate 1115 and merchant computer system's 130 signature public key certificate 1120. Payment gateway computer system 140 performs this verification by making a call to the certification authorities associated with each certificate. If verification of either certificate fails, payment gateway computer system 140 rejects the capture request.

In function block 1225, payment gateway computer system 140 validates merchant digital signature 1125. Payment gateway computer system 140 performs this validation by calculating a message digest over the contents of the combined basic capture request 1110, the encryption public key certificate 1115 and the signature public key certificate 1120. Payment gateway computer system 140 then decrypts digital signature 1125 to obtain a copy of the equivalent message digest calculated by merchant computer system 130 in function block 1020. If the two message digests are equal, the digital signature 1125 is validated. If validation fails, payment gateway computer system 140 rejects the capture request.

In function block 1230, payment gateway computer system 140 applies its private key to encrypted random key RK-2 790 contained within received merchant capture request 915, thereby decrypting it and obtaining a cleartext version of random key RK-2 775. In function block 1235, payment gateway computer system 140 applies random key RK-2 775 to encrypted capture token 780, thereby decrypting it and obtaining a cleartext version of capture token 770.

In function block 1240, payment gateway computer system 140 verifies that a proper transaction is being transmitted between capture token 780 and capture request 1110. A capture token contains data that the gateway generates at the time of authorization. When the authorization is approved, the encrypted capture token is given to the merchant for storage. At the time of capture, the merchant returns the capture token to the gateway along with other information required for capture. Upon receipt of the capture token, the gateway compares a message made of the capture request data and the capture token data and transmits this information over a traditional credit/debit network. If an improperly formatted transaction is detected, payment gateway computer system 140 rejects the capture request.

In function block 1245, payment gateway computer system 140 determines the financial institution for which capture is requested by inspection of basic capture request 1110. Payment gateway computer system 140 contacts the appropriate financial institution using a secure means, e.g., a direct-dial modem-to-modem connection, or a proprietary internal network that is not accessible to third parties, and using prior art means, instructs a computer at the financial institution to perform the requested funds transfer.

Payment Capture Response Generation

Function blocks 1250 through 1285 depict the steps of generating and transmitting a payment capture request response. FIGS. 13A through 13F depict views of the payment capture response and its component parts.

Figure 13A:
FIGS. 13A through 13F depict views of the payment capture response and its component parts in accordance with a preferred embodiment.

In function block 1250, payment gateway computer system 140 creates a basic capture response 710. The basic capture request is a data area that includes all the information to indicate whether a capture request was granted or denied. FIG. 13A depicts basic authorization request 1310.

In function block 1255, payment gateway computer system 140 combines basic capture response 1310, and a copy of its signature public key certificate 1320. Payment computer system 140 calculates a digital signature 1325 for the combined contents of the combined block 1330 comprising basic capture response 1310 and the signature public key certificate 1320, and appends the signature to the combination of the combined basic authorization request 1310 and the signature public key certificate 1320. The payment gateway computer system 140 calculates digital signature 1325 by first calculating a message digest over the contents of the combined basic capture response 1310 and signature public key certificate 720. The message digest is then encrypted using the merchant computer system's 130 digital signature private key, thus forming a digital signature.

Figure 13B:
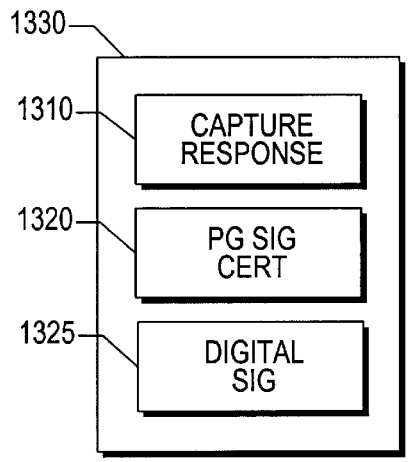

FIG. 13B depicts the combined block 1330 formed by function block 1255 and containing basic capture request 1310, the signature public key certificate 1320, and digital signature 1325.

Figure 13C:

In function block 1260, payment gateway computer system 140 generates a symmetric random encryption key 1340, denoted as RK-4. FIG. 13C depicts random encryption key RK-4 1340.

Figure 13D:
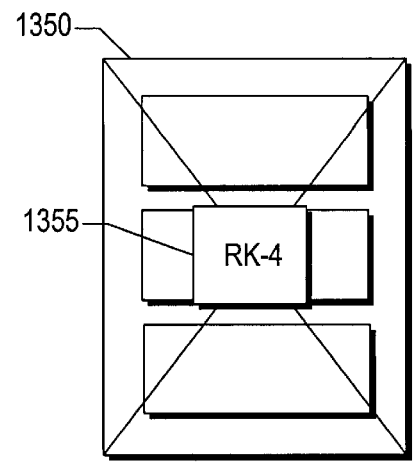

In function block 1275, payment gateway computer system 140 encrypts combined block 1330 using random encryption key RK-4 1340 to form encrypted combined block 1350. FIG. 13D depicts encrypted combined block 1350. The encryption state of encrypted combined block 1350 is graphically shown by random key lock 1355, which indicates that encrypted combined block 1350 is encrypted using random key RK-4 1340.

Figure 13E:
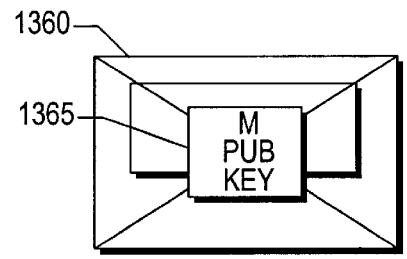

In function block 1275, payment gateway computer system 140 encrypts random encryption key RK-4 1340 using the public key of merchant computer system 130 to form encrypted random key RK-4 1360. FIG. 13E depicts encrypted random key RK-4 1360. The encryption state of encrypted random key 1360 is graphically shown by merchant public key lock 1365, which indicates that encrypted random key 1360 is encrypted using the merchant public key.

Figure 13F:
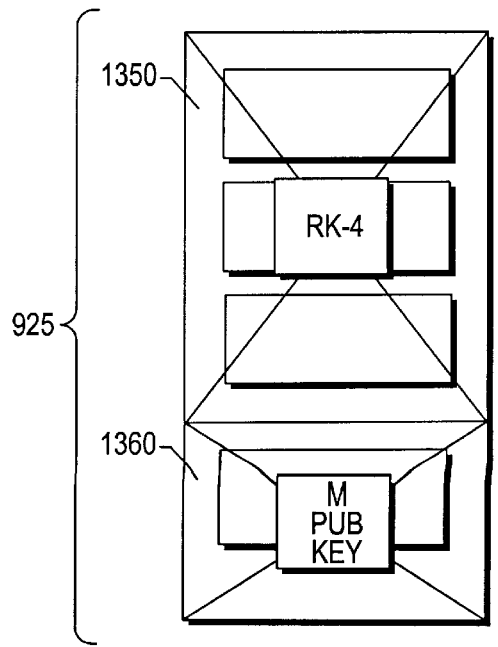

In function block 1280, payment gateway computer system 140 concatenates encrypted combined block 1350 and encrypted random key RK-4 1360 to form merchant capture response 925. FIG. 13F depicts merchant capture response 925 comprising encrypted combined block 1350 and encrypted random key RK-4 1360. In function block 1285, payment gateway computer system 140 transmits merchant capture response 925 to merchant system 130.

Payment Capture Response Processing

FIG. 14 depicts the detailed steps of processing a payment capture response. In function block 1410, merchant computer system 130 applies its private key to encrypted random key RK-4 1360 contained within received merchant capture response 925, thereby decrypting it and obtaining a cleartext version of random key RK-4 1340.

In function block 1420, merchant computer system 130 applies random key RK-4 1340 to encrypted combined block 1350, thereby decrypting it and obtaining a cleartext version of combined block 1330. It will be recalled that combined block 1330 comprises basic capture response 1310, a copy of payment gateway computer system's 140 signature public key certificate 1320, as well as payment gateway digital signature 1325.

In function block 1430, merchant computer system 130 verifies payment gateway computer system's 140 signature public key certificate 1320. Merchant computer system 130 performs this verification by making a call to the certification authority associated with the certificate. If verification of the certificate fails, merchant computer system 130 concludes that the capture response is counterfeit and raises an error condition.

In function block 1440, merchant computer system 130 validates payment gateway digital signature 1325. Merchant computer system 130 performs this validation by calculating a message digest over the contents of the combined basic authorization request 1310 and the signature public key certificate 1320. Merchant computer system 130 then decrypts digital signature 1325 to obtain a copy of the equivalent message digest calculated by payment gateway computer system 140 in function block 1255. If the two message digests are equal, the digital signature 1325 is validated. If validation fails, merchant computer system 130 concludes that the authorization response is counterfeit and raises an error condition.

In function block 1450, merchant computer system 130 stores capture response for later use in by legacy system accounting programs, e.g. to perform reconciliation between the merchant operating merchant computer system 130 and the financial institution from whom payment was requested, thereby completing the transaction.

The system of the present invention permits immediate deployment of a secure payment technology architecture such as the SET architecture without first establishing a public-key encryption infrastructure for use by consumers. It thereby permits immediate use of SET-compliant transaction processing without the need for consumers to migrate to SET-compliant application software.

All publications and existing subsystems mentioned in this specification are hereby incorporated by reference to the same extent as if each individual publication or existing subsystem were specifically and individually indicated to be incorporated by reference.

While various embodiments of a preferred embodiment have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for initiating secure communication between a customer computer and a merchant computer connected to a network for receiving and transmitting a payment transaction, comprising the steps of:

(a) establishing a communication between said customer computer and said merchant computer via said network;

(b) identifying an encryption algorithm and a decryption algorithm utilized by said customer computer and said merchant computer;

(c) transmitting an encrypted payment transaction from said customer computer to said merchant computer;

(d) receiving said encrypted payment transaction at said merchant computer and decrypting said encrypted payment transaction utilizing said decryption algorithm; and (e) reformatting said payment transaction to substantially comply with a third party secure protocol for further payment processing.

2. The method as recited in claim 1, including the step of utilizing the Internet for transmitting information between said customer computer and said merchant computer.

3. The method as recited in claim 1, including the step of transmitting said payment transaction from said merchant computer to a third computer for authorizing or denying credit in said further payment processing.

4. The method as recited in claim 1, wherein said secure third party protocol is a protocol specified by one or more credit associations.

5. A method for initiating secure communication between a first and a second computer connected to a network for receiving and transmitting a payment transaction, comprising the steps of:

(a) obtaining client information for use in said secure communication between said first and said second computer;

(b) establishing a communication between said first and said second computer via said network; and (c) reformatting said client information into said payment transaction which substantially complies with a third party secure protocol for further payment processing.

6. The method as recited in claim 5, including:

(d) transmitting an encrypted payment transaction from said first computer to said second computer;

(e) receiving said encrypted payment transaction at said second computer and decrypting said encrypted payment utilizing a decryption algorithm; and (f) performing further payment processing on said payment transaction.

7. The method as recited in claim 5, wherein said client information is obtained via a telephone, fax machine or electronic mail.

8. The method as recited in claim 7, wherein said client information is obtained via a secure general purpose protocol.

9. The method as recited in claim 5, wherein an electronic signature is utilized to authenticate processing of said payment transaction.

10. The method as recited in claim 5, further comprising reversing one or more previous payment transactions.

11. The method as recited in claim 5, wherein said first computer is a merchant computer and said second computer is a gateway computer.

12. Apparatus for initiating payment processing in a customer computer and a merchant computer under the control of software connected to a network for receiving and transmitting a payment transaction, comprising:

(a) means for establishing a communication between said customer computer and said merchant computer via said network;

(b) means for identifying an encryption algorithm and a decryption algorithm utilized by said customer computer and said merchant computer;

(c) means for transmitting an encrypted payment transaction from said customer computer to said second computer;

(d) means for receiving said encrypted payment transaction at said merchant computer and decrypting said encrypted payment transaction utilizing said decryption algorithm; and (e) means for reformatting said payment transaction to substantially comply with a secure third party protocol for further payment processing.

13. The apparatus as recited in claim 12, including means for utilizing the Internet for transmitting information between said customer computer and said merchant computer.

14. The apparatus as recited in claim 12, including means for transmitting said payment transaction from said merchant computer to a third computer for authorizing or denying credit in said further payment processing.

15. An apparatus for initiating a secure communication between a first and a second computer connected to a network for receiving and transmitting a payment transaction, comprising:

(a) communication hardware utilized by a client to communicate information for use in said secure communication between said first and said second computer;

(b) the first computer under the control of software which establishes said secure communication between said first and said second computer via said network; and (c) the first computer under the control of software which reformats said payment transaction to substantially comply with a third party secure protocol for further payment processing.

16. The apparatus as recited in claim 15, wherein said first computer is a merchant computer and said second computer is a gateway computer.

17. A computer program embodied on a computer-readable medium for effecting purchase transactions by a customer system at a merchant system and effecting payment for said transactions by a payment system, comprising:

(a) a code segment for controlling secure communication of a purchase request from said customer system to said merchant system using a first communication method, including providing payment information from said customer system to said merchant system;

(b) a code segment for controlling secure processing of said payment information by said merchant system to reformat said payment information into a payment authorization request and securely transmit said payment authorization request from said merchant system to said payment system using a second communication method;

(c) a code segment for controlling the secure processing of said payment authorization request by said payment system to generate a payment authorization response authorizing said purchase and securely transmit said payment authorization response to said merchant system using the second communication method pursuant to which said merchant system fills said purchase request;

(d) a code segment for controlling the secure processing of said payment authorization response by said merchant system to generate a payment capture request and securely transmit said payment capture request to said payment system using the second communication method;

(e) a code segment for controlling the secure processing of said payment capture request by said payment system to generate a payment capture response authorizing payment and transmit said payment capture response to said merchant system using the second communication method; and (f) a code segment for controlling the secure processing of said payment capture response by said merchant system to effect payment to the merchant system for filling said purchase request.

18. A computer program embodied on a computer-readable medium as recited in claim 17, wherein said secure protocol is a protocol specified by one or more credit associations.

19. A computer program embodied on a computer-readable medium as recited in claim 17, wherein said payment authorization request is generated by reformatting said payment information to substantially comply with a third party secure protocol.

20. A computer program embodied on a computer-readable medium as recited in claim 17, wherein said secure communication between said customer system and said merchant system is transmitted over a first communications system, and wherein said payment authorization request, said payment authorization response, said payment capture request, and said payment capture response are transmitted between said merchant system and said payment system over a second communications system.

21. A computer program embodied on a computer-readable medium as recited in claim 20, wherein said first communications system is a public network system, and wherein said second communications system is a private communications system.

22. A computer program embodied on a computer-readable medium for initiating payment processing in a customer and a merchant computer under the control of software, said customer and said merchant computer connected to a network for receiving and transmitting a payment transaction, comprising:

(a) a code segment for establishing a communication between said customer computer and said merchant computer via said network;

(b) a code segment for identifying an encryption algorithm and a decryption algorithm utilized by said customer computer and said merchant computer;

(c) a code segment for transmitting an encrypted payment transaction from said customer computer to said merchant computer;

(d) a code segment for receiving said encrypted payment transaction at said merchant computer and decrypting said encrypted payment transaction utilizing said decryption algorithm; and (e) a code segment for reformatting said payment transaction to substantially comply with a secure protocol for further payment processing.

23. A computer program embodied on a computer-readable medium for effecting one or more purchase requests by a merchant computer system and payment for said purchase requests by a payment computer system, comprising:

(a) a code segment controlling communication between a customer computer system and said merchant computer system for effecting said purchase requests, including providing payment information from said customer computer system to said merchant computer system;

(b) a code segment reformatting said payment information to substantially comply with a third party protocol; and (c) a code segment controlling secure communication between said merchant computer system and said payment computer system for effecting operation on said payment information by said merchant computer system to obtain authorization information from said payment computer system to said merchant computer system pursuant to which said merchant computer system completes said purchase requests.

* * * * *

UNITED STATES PATENT AND TRADEMARK OFFICE
CERTIFICATE OF CORRECTION

PATENT NO. : 5,987,140
DATED : November 16, 1999
INVENTOR(S) : Rowney et al.

It is certified that error appears in the above-identified patent and that said Letters Patent is hereby corrected as shown below:

Column 20,
Line 31, after "transmitting" insert -- information for use in performing --
Lines 42, 43-44, 46 and 53, delete "payment transaction" and insert therefor -- information --
Line 50, after "transmitting" insert -- said --
Line 61, after "transmitting" insert -- payment information for use in performing --

Column 21,
Lines 2, 5, 7, 11, 20, 40, 42 and 44, delete "transaction" and insert therefor -- information --
Line 9, after "payment" insert -- information --
Lines 30 and 58, after "transmitting" insert -- information for use in permitting --
Lines 37 and 67, delete "payment transaction" and insert therefor -- information --
Line 49, after "transmitting" insert -- said --
Line 53, delete "transaction" and insert therefor -- information --
Line 61, after "communicate" insert -- security --

Column 23,
Line 7, after "transmitting" insert -- information for use in permitting --
Lines 16 and 19, delete "payment transaction" and insert therefor -- information --
Lines 21 and 23, delete "transaction" and insert therefor -- information --

Signed and Sealed this

Twelfth Day of April, 2005

JON W. DUDAS
*Director of the United States Patent and Trademark Office*